(12) United States Patent
Arriola et al.

(10) Patent No.: US 7,193,024 B2
(45) Date of Patent: Mar. 20, 2007

(54) ALPHA-OLEFIN BASED BRANCHED POLYMER

(75) Inventors: Daniel J Arriola, Midland, MI (US); Francis J. Timmers, Midland, MI (US); David D. Devore, Midland, MI (US); Oscar D. Redwine, Coleman, MI (US)

(73) Assignee: Dow Global Technology Inc., Midland, MI (US)

( * ) Notice: Subject to any disclaimer, the term of this patent is extended or adjusted under 35 U.S.C. 154(b) by 138 days.

(21) Appl. No.: 10/481,064

(22) PCT Filed: Jun. 13, 2002

(86) PCT No.: PCT/US02/19002

§ 371 (c)(1),
(2), (4) Date: Jun. 14, 2004

(87) PCT Pub. No.: WO02/102863

PCT Pub. Date: Dec. 27, 2002

(65) Prior Publication Data

US 2004/0215404 A1 Oct. 28, 2004

(51) Int. Cl.
*C08F 112/08* (2006.01)
*C08F 112/36* (2006.01)
*C08F 112/10* (2006.01)

(52) U.S. Cl. .................. 526/347.1; 526/336; 526/339; 526/172

(58) Field of Classification Search ............ 526/347.1, 526/336, 339, 172
See application file for complete search history.

(56) References Cited

U.S. PATENT DOCUMENTS

| | | | | |
|---|---|---|---|---|
| 3,717,559 A * | 2/1973 | Oyama et al. | ............. | 521/50.5 |
| 4,985,495 A * | 1/1991 | Nishio et al. | .................. | 525/68 |
| 5,037,890 A * | 8/1991 | Yokoyama et al. | ......... | 525/250 |
| 5,064,802 A | 11/1991 | Stevens et al. | ............. | 502/155 |
| 5,153,157 A | 10/1992 | Hlatky et al. | ................ | 502/117 |
| 5,229,463 A * | 7/1993 | Yano et al. | .................. | 525/240 |
| 5,296,433 A | 3/1994 | Siedle et al. | ................ | 502/117 |
| 5,321,106 A | 6/1994 | LaPointe et al. | ............ | 526/126 |
| 5,350,723 A | 9/1994 | Neithamer et al. | ......... | 502/104 |
| 5,425,872 A | 6/1995 | Devore et al. | | |
| 5,608,009 A * | 3/1997 | Machida et al. | ............. | 525/247 |
| 5,616,664 A | 4/1997 | Timmers et al. | ............ | 526/127 |
| 5,625,087 A | 4/1997 | Devore et al. | ............... | 556/468 |
| 5,721,185 A | 2/1998 | LaPointe et al. | ............ | 502/117 |
| 5,783,512 A | 7/1998 | Jacobsen et al. | ............ | 502/124 |
| 5,883,204 A | 3/1999 | Spencer et al. | ............. | 526/134 |
| 5,919,983 A | 7/1999 | Rosen et al. | .................... | 568/3 |
| 6,096,849 A * | 8/2000 | Chung et al. | ................ | 526/336 |
| 6,121,185 A | 9/2000 | Rosen et al. | ................. | 502/164 |
| 6,211,111 B1 | 4/2001 | Chen et al. | .................. | 502/152 |
| 6,214,760 B1 | 4/2001 | Chen et al. | .................. | 502/103 |

FOREIGN PATENT DOCUMENTS

| | | |
|---|---|---|
| EP | 0277003 | 8/1988 |
| EP | 0315431 | 5/1989 |
| EP | 891 989 A1 * | 1/1999 |
| JP | 5-17539 A * | 1/1993 |
| WO | 96/28480 | 9/1996 |
| WO | 99/10424 | 3/1999 |
| WO | 99/15534 | 4/1999 |
| WO | 99/42467 | 8/1999 |
| WO | 00/12572 | 3/2000 |
| WO | WO 00/47643 A1 * | 8/2000 |
| WO | 02/38628 | 5/2002 |

OTHER PUBLICATIONS

J. Am. Chem. Soc., 118, 267-268 (1996).
J. Am. Chem. Soc., 117, 6414-6415 (1995).
Organometallics, 16, 1514-1516, (1997).
Ewen et al., J. Am. Chem. Soc. 110, 6255-6256 (1988).
Wild et al., J. Organomet. Chem., 232, 233-47, (1982).
Hanson E.W. et al, Polymer vol. 37, No. 1, 1996, 19-24.
J.C. Randall et al., in "NMR and macromolecules". ACS Symposium series 247, Am. Chem. Soc., Washington, DC, 1984, Chap. 9.
Kakugo et al., Macromol., vol. 15, 1150 (1982).
Kang-Bong Lee et al., Polymer Journal, vol. 28, No. 8, pp. 696-702 (1996).
Macromolecules 2000, 33, pp. 7489-7499.
J. Meissner in Proc. XIIth International Congress on Rheology, Quebec, Canada, Aug. 1996, pp. 7-10.
J. Meissner and J. Hostetter, Rheol. Acta, 33, 1-21 (1994).

* cited by examiner

*Primary Examiner*—David W. Wu
*Assistant Examiner*—Rip A Lee

(57) ABSTRACT

A polymer comprising units (1) derived from an alpha-olefin having at least 3 carbon atoms (1'), units (2) derived from divinylbenzene or $C_{1-10}$ hydrocarbyl substituted derivatives thereof (2'), and units (3) derived from ethylene (3'), the polymer comprising at least 75 mole % of units (1), from 0.01 to 5 mole % of units (2), and up to 20 mole % of units (3), the polymer having a branching factor BF 0.75. A process for preparing a polymer comprising units (1) derived from an alpha-olefin having at least 3 carbon atoms (1'), units (2) derived from divinylbenzene or $C_{1-10}$ hydrocarbyl substituted derivatives thereof (2'), and units (3) derived from ethylene (3'), by contacting the alpha-olefin (1'), the divinylbenzene compound (2'), and ethylene (3') in the presence of a polymerisation catalyst under polymerisation conditions wherein the mole ratio of alpha-olefin (1') to divinylbenzene or $C_{1-10}$ hydrocarbyl substituted derivatives thereof (2') is at least 10:1, the mole ratio of divinylbenzene or $C_{1-10}$ hydrocarbyl substituted derivatives thereof (2') to ethylene (3') is in the range of from 1:0.1 to 1:2000, and the mole ratio of (1') to (3') is at least 4:1.

18 Claims, 5 Drawing Sheets

Figure 2:
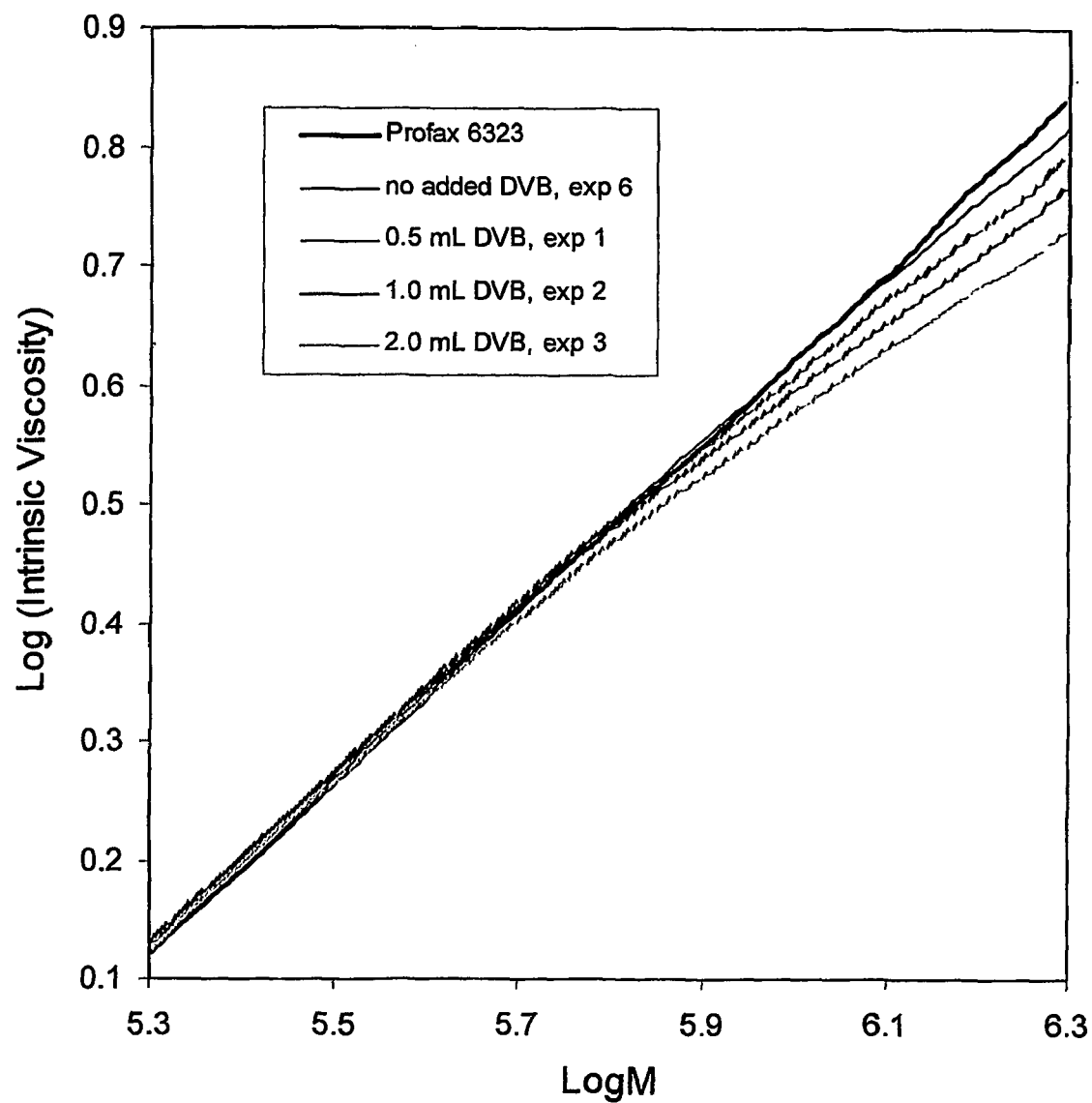

Fig. 1:
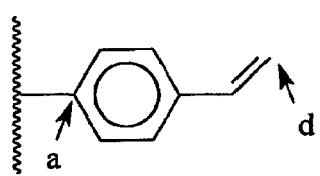
Fig. 1A
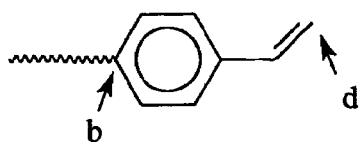
Fig. 1B
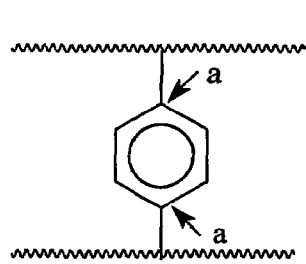
Fig. 1C
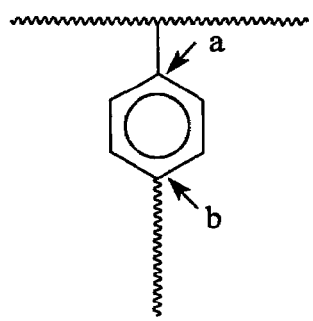
Fig. 1D
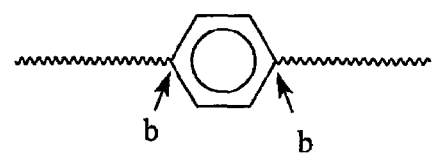
Fig. 1E

ALPHA-OLEFIN BASED BRANCHED POLYMER

The present invention relates to polymers derived from alpha-olefins having 3 or more carbon atoms, a divinylbenzene compound, and ethylene, as well as to a process for preparing the same.

Polymers of alpha-olefins having 3 or more carbon atoms are typically produced using coordination catalysts or Ziegler-Natta type catalysts resulting in linear polymeric chains having two of the carbon atoms of such an alpha-olefin incorporated in the polymer backbone, the remaining carbon atoms pending from such backbone as short side-chains, for example a methyl side chain in case of propylene as monomer.

To improve certain properties of such polymers, especially strength properties during melt processing, it has been proposed to provide such polymers with longer chain branches or with varying degrees of cross-linking. These proposals involved post treatment of polymers such as by irradiation of the polymers, introducing reactive groups on the polymers which can serve as crosslinking or branching points, and by the use of free radical cross-linking agents. These post treatment methods have as a disadvantage that a separate step needs to be added to the process to bring about the extended branching. Alternatively, in-reactor branching technologies have been proposed such as described in WO/0012572 in which reaction conditions are provided such that polymer chains already formed with a terminal vinyl moiety can participate in the polymerization reaction to form another polymer chain so as to provide a long chain branch. A disadvantage of this method is that it is difficult to control the reaction conditions necessary to give high enough concentrations of these vinyl terminated polymer chains. As a result, the extent of branching in the product becomes limited. Another in-reactor branching technology involves using di- or multi-functional comonomers of which one functionality is incorporated into the polymer backbone and the other functionality can participate in a branching or crosslinking reaction. Examples of such multifunctional comonomers are alpha-omega dienes such as 1,7-octadiene. These in-reactor methods lead to tetra-functional branching which can lead to the formation of high molecular weight polymer gels. A disadvantage of using alpha-omega dienes for in-reactor branching is that it is difficult to get high levels of branching without risking the formation of gels and subsequent reactor scaling and fouling. High molecular weight gels are also detrimental to the performance properties of the resulting polymer product. When the reactivity of one olefinic group of the alpha-omega diene is far lower than the other olefnic group, the polymerization reaction becomes more stable to gel formation but a disadvantage is that this leaves many unreacted pendant olefinic groups and gives product polymers with poor long term stability towards heat, light and air oxidation.

U.S. Pat. No. 5,608,009 discloses olefin copolymers comprising a unit derived from an olefin and a unit derived from a diolefin having a weight-averaged molecular weight in the range of 200 to 800,000, the content of the diolefin derived unit is in the range of 0.002 to 30 mole % and the ratio of the total content of unsaturated groups observed in a molecular chain in mole % (TUS) to the content of the diolefin derived unit in mole % (DOU) is from 0.001 to 200. In the process of making these copolymers, conditions are selected such as to advance the formation of unsaturated groups such as terminal vinyl groups (column 16, lines 8–29). These copolymers are typically intermediate products having a certain degree of unsaturation which makes them suitable for grafting functional groups onto the polymeric chain or for hydrogenating to produce saturated copolymers.

U.S. Pat. No. 6,096,849 discloses copolymers containing alpha-olefin and divinylbenzene comonomer units having a linear molecular structure and characterized by a mole ratio of unsaturation/divinylbenzene (TUS/DOU) of near unity. The divinylbenzene unit incorporated in the copolymer typically will have on the average one of the vinyl groups incorporated in the polymeric chain whereas the other vinyl group remains unreacted as a pendant vinyl group as shown in Formula (1) in column 5. These copolymers preferably have a narrow molecular weight distribution and a narrow composition distribution.

The polymers exemplified in U.S. Pat. Nos. 5,608,009 and 6,096,849 are polymers which predominantly contain ethylene as monomer (i.e., more than 50 mole percent ethylene).

EP-A-315,431 discloses a process for producing a graftmodified alpha-olefin copolymer by first copolymerizing an alpha-olefin of 2 to 20 carbon atoms with a dialkenylbenzene in the presence of a Ziegler-Natta catalyst to form a copolymer having an ethylenically unsaturated bond and subsequently graft polymerizing an anionically polymerizable monomer onto said copolymer. According to the authors of EP-A-351,431 (see page 6, line 53 to page 7, line 6), the unsaturation is believed to be due to only one of the two alkenyl groups in the dialkenylbenzene participating in the copolymerization with the alpha-olefin, the other one remaining as a monoalkenylbenzene. A number of examples in EP-A-315,431 teaches the copolymerization of ethylene, propylene and divinylbenzene, yet polymerization conditions used are such that polymers are formed which predominantly contain ethylene and have remaining unsaturation.

It is desired to provide polymers having as a main component a unit derived from an alpha-olefin having at least three carbons atoms with improved processability properties thereby maintaining the advantageous properties of the polymers of said higher alpha-olefin.

It is also desired to provide such polymers in a single polymerization reaction step.

It is further desired to provide polymers having as a main component a unit derived from an alpha-olefin having at least three carbons atoms as well as providing a polymer that contains little olefinic unsaturation to improve the polymer's resistance to degradation.

It is also desired to provide polymers having a significant or controllable degree of tacticity with improved processing properties.

These objectives are met separately or in combination by the embodiments or preferred embodiments of the invention as described herein.

According to the present invention there is provided a polymer comprising units (1) derived from an alpha-olefin having at least 3 carbon atoms (1'), units (2) derived from divinylbenzene or $C_{1-10}$ hydrocarbyl substituted derivatives thereof (2'), and units (3) derived from ethylene (3'), the polymer comprising at least 75 mole % of units (1), from 0.01 to 5 mole % of units (2), and up to 20 mole % of units (3), the polymer having a branching factor BF 0.75, factor BF representing the ratio D/(A+B) wherein D, A, and B are integrated signal values determined by quantitative carbon-13 NMR spectroscopy of the polymer wherein A represents the integrated value of the signals in the range of 145.0 to 142.5 ppm, B represents the integrated value of the signals in the range of 142.5 to 139.0 ppm and D represents the integrated value of the signals in the range of 115.0 to 112.5 ppm.

According to a further embodiment, the invention provides a process for preparing a polymer comprising units (1) derived from an alpha-olefin having at least 3 carbon atoms (1'), units (2) derived from divinylbenzene or $C_{1-10}$ hydrocarbyl substituted derivatives thereof (2'), and units (3) derived from ethylene (3'), by contacting the alpha-olefin (1'), the divinylbenzene compound (2'), and ethylene (3') in the presence of a polymerization catalyst under polymerization conditions wherein the mole ratio of alpha-olefin (1') to divinylbenzene or $C_{1-10}$ hydrocarbyl substituted derivatives thereof (2') is at least 10:1, the mole ratio of divinylbenzene or $C_{1-10}$ hydrocarbyl substituted derivatives thereof (2') to ethylene (3') is in the range of from 1:0.1 to 1:2000, and the mole ratio of alpha-olefin (1') to ethylene (3') is at least 4:1.

According to yet another embodiment, the present invention relates to blends containing and articles prepared from or containing the polymers of the invention.

FIG. 1 depicts the different ways in which the divinylbenzene compound or its substituted derivative can be incorporated into a polymer, with in FIGS. 1A and 1B only one of the two vinyl groups having reacted and in FIGS. 1C, 1D, and 1E both of the vinyl groups having reacted.

Figure 4:
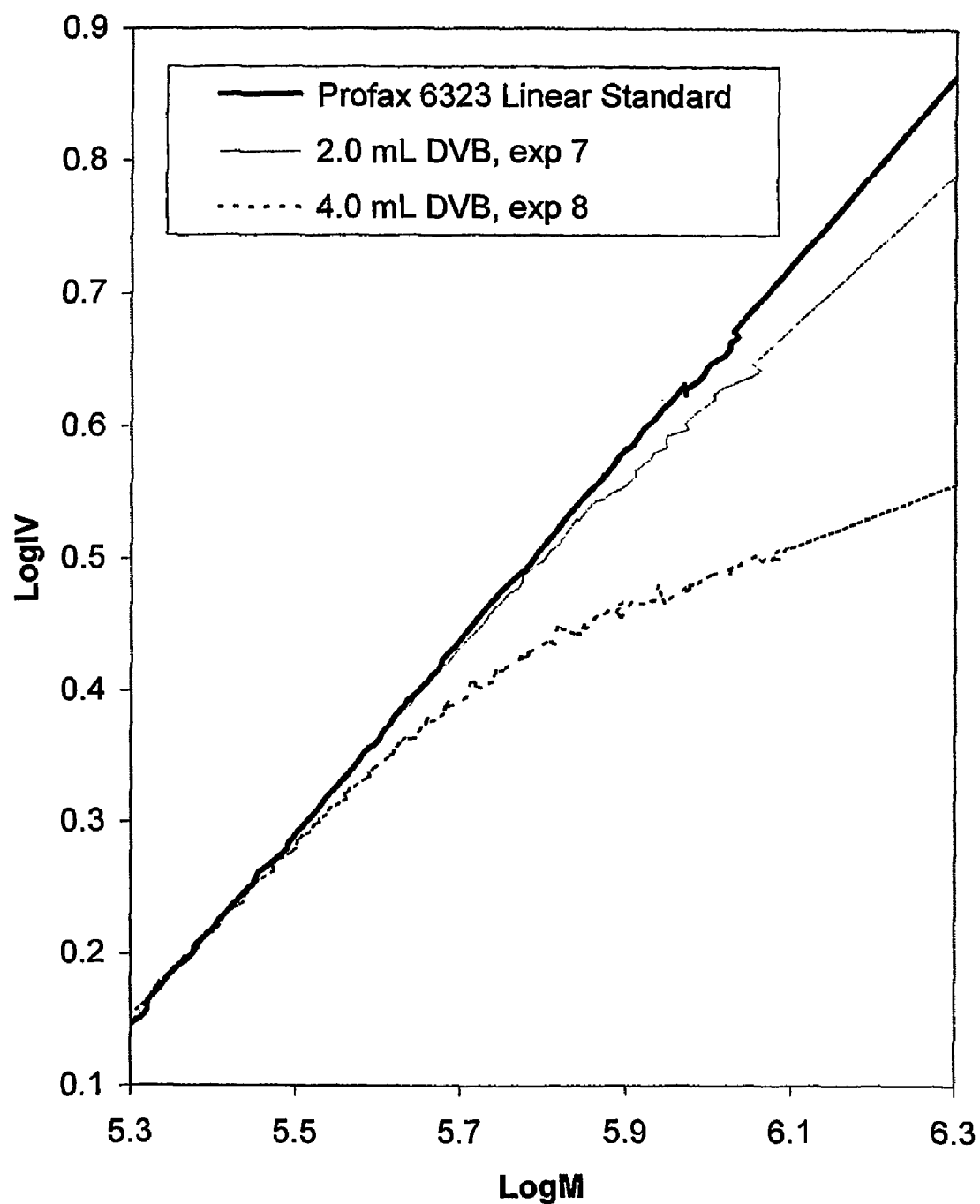
Figure 5:
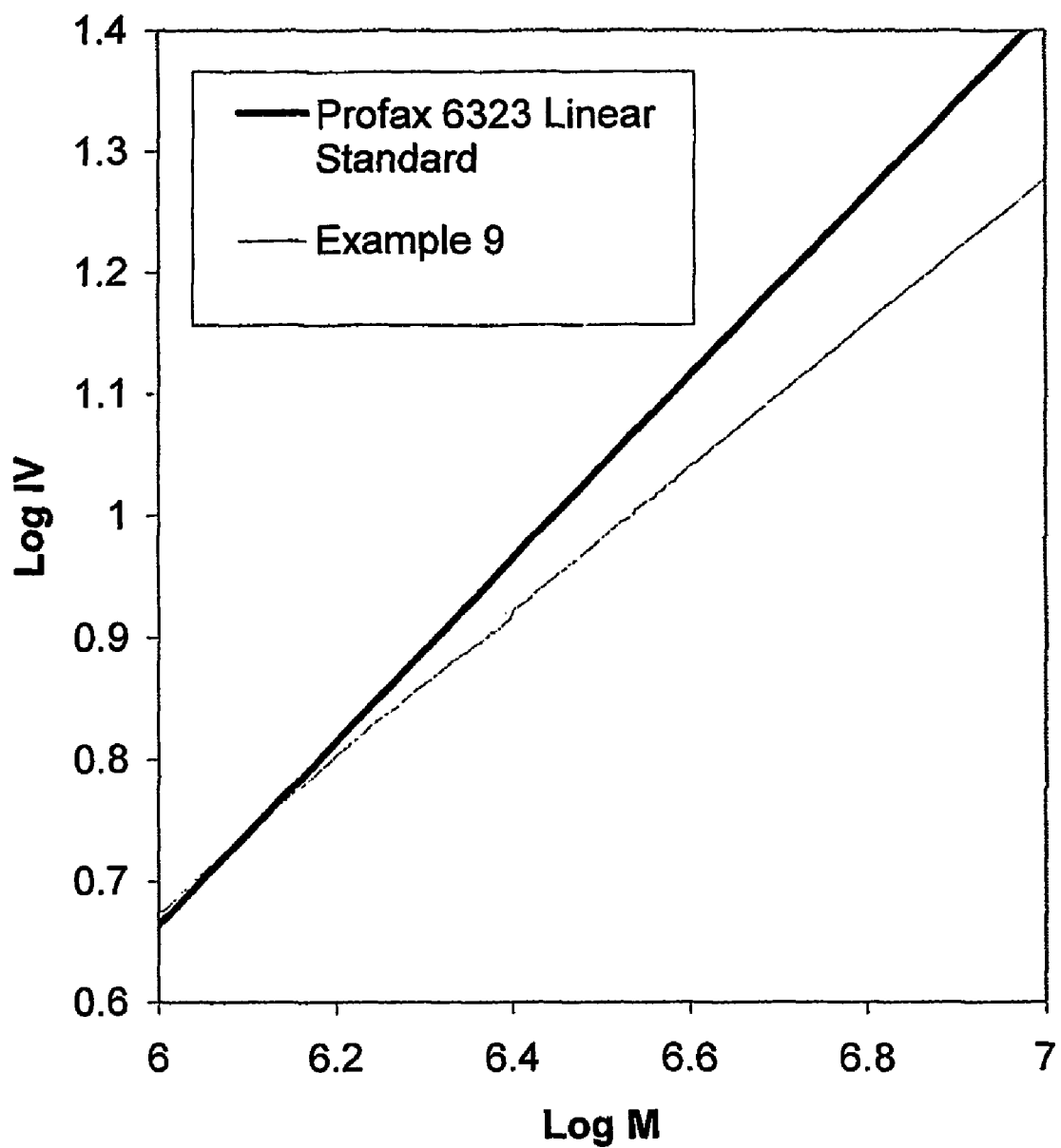

FIGS. 2, 4, and 5 show the relationship between intrinsic viscosity and molecular weight (both expressed as log values) of the polymers of the present invention and a comparative polymer.

Figure 3:
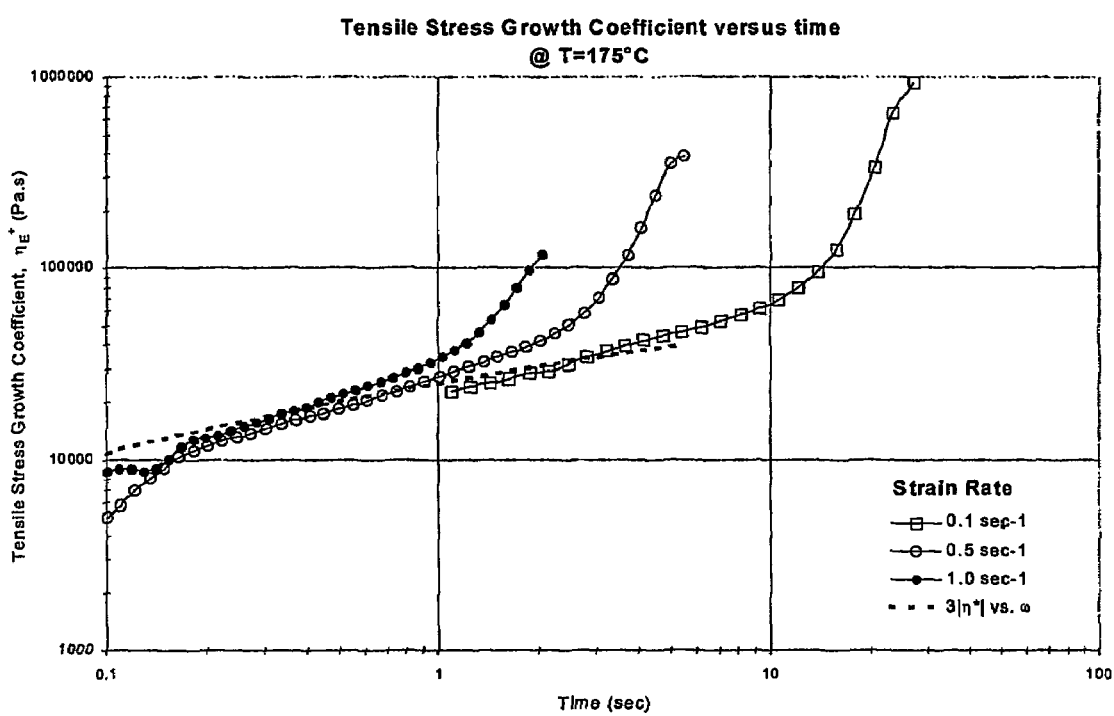

FIG. 3 shows the relationship between tensile stress growth and time a a polymer according to the invention.

The units referred to by numbers (1), (2), and (3) as used herein are the units as incorporated in the polymer of the present invention. The monomers referred to by numbers (1'), (2'), and (3') are the monomers used in the process to prepare the polymers which incorporate units derived from these monomers.

According to the present invention it was found that in polymerizing one or more alpha-olefin with 3 or more carbon atoms (1') and a divinylbenzene compound, DVB, (2'), together with a relatively small amount of ethylene (3') more highly branched polymers are obtained in one reaction step. Such branched polymers have improved melt rheological properties. The branching is believed to be controlled to be primarily tri-functional branching or a mixture of tri-functional and tetra-functional branching. The terms branched and branching as used herein mean that the respective polymer has a branching factor, BF as defined herein, which is equal to or smaller than 0.75. Such branching is believe to correspond to long chain branched or hyper branched structures and not the short chain branching obtained from the substituent on the alpha-olefin unit 1'. With tri-functional branching is meant that three polymeric chain segments are connected to one common monomer residue and with tetra-functional branching is meant that four polymeric chain segments are connected to one common monomer residue. For DVB a tri-functional branch results when the vinyl group of one end of the DVB is incorporated into a mid-chain position and, as a result, it is connected to two polymer chain segments while the vinyl group of the other end of the same DVB residue is incorporated at the end of a chain segment. A tetra-functional branch results when both vinyl groups of the DVB are incorporated into a growing polymer chain so that the DVB monomer residue is connected to four polymer chain segments. With the term DVB or divinylbenzene compound as used herein is meant o-, m-, and p-divinylbenzene and $C_{1-10}$ hydrocarbyl substituted derivatives thereof.

The present invention allows the production of a substantially unsaturated group-free, branched polymer in a single reactor step without requiring further hydrogenating of the polymer which provides the present branched polymers with excellent stability against heat, air oxidation and radiation by ambient light.

The branching factor, BF, used to define the polymers of the present invention is the ratio D/(A+B) which is determined from the integrated signal values by quantitative carbon-13 NMR spectroscopy in the range of 145.0 to 142.5 ppm for A, in the range of 142.5 to 139.0 ppm for B, and in the range of 115.0 to 112.5 ppm for D. Without wishing to be bound by any theory, it is believed that the carbon-13 NMR integral values indicated by upper-case letters above have a one-to-one correspondence to the carbon atoms indicated by the same lower-case letter in FIG. 1. Quantitative carbon-13 NMR data was obtained with ca. 0.04–0.65 g of polymer dissolved in 3 ml of deuterated 1,1,2,2-tetrachloroethane containing 0.066M of $Cr(AcAc)_3$ as a relaxation agent. All chemical shifts are relative to the carbon signals of the solvent (tetrachloro ethane) assigned to 74.5 ppm. Data was taken with 90° observe-pulses, WALTZ decoupling during acquisition only, and a repetition rate of at least 1.8s. Samples were carefully degassed by purging with an inert gas or placing the NMR tube under vacuum prior to heating. NMR data was acquired at 125° C.

Branching factor, BF, is an indication of the degree of branching by relating the amount of vinyl groups of the DVB compound incorporated in the polymer that has not reacted (olefinic unsaturation at carbon d in FIGS. 1A and 1B) to the amount of vinyl groups of the DVB compound that has reacted and thus has been incorporated in a polymeric chain segment either at the end thereof (at carbon b in FIG. 1D and FIG. 1E) or in a mid-chain position (at carbon a in FIG. 1C and FIG. 1D). BF should be equal to or higher than 0 and equal to or less than 0.75. For the same content of DVB, if BF is higher the degree of polymer branching will be lower since fewer of the DVB groups are participating in branching. Preferably, the 0 BF 0.50, more preferably 0 BF 0.25, and even more preferably 0 BF 0.15.

Similarly, branching type factor, BTF, represents the ratio (B/A) wherein A and B are as described with relation to BF. The BTF ratio relates the relative populations of vinyl groups incorporated at the end of a polymer chain segment (at carbon b in FIG. 1D and FIG. 1E) to the relative population of vinyl groups incorporated in a mid-chain position (at carbon a in FIG. 1C and FIG. 1D). On the average this will represent the relative population of tri-functional branching to tetra-functional branching. The BTF ratio does not indicate the overall degree of branching in the polymer. The degree of branching in the polymer is controlled by the BF ratio and the level of DVB incorporated in the polymer. BTF for the branched polymers of the invention should be 0.01. BTF generally is smaller than 100. Preferably, 0.01 BTF 50, more preferably 0.1 BTF 10. If the degree of branching in the polymer is high enough (i.e., DVB unit (2) content 0.10 mole percent and BF 0.75) then a BTF<0.01 would give polymers with too many tetra-functional branches and the possibility of gels.

In the present polymers unit (1) is preferably derived from an alpha-olefin (1') having at least 3 carbon atoms, and preferably from 3 to 20 carbon atoms. Examples include propylene, 1-butene, 1-pentene, 4-methyl-1-pentene, 1-hexene, 1-octene, 1-decene, and 1-dodecene. The most preferred alpha-olefin is propylene. In the present invention, these alpha-olefins may be used alone or in a combination of two or more thereof. Preferred combinations are propylene with one or more alpha-olefins with 4 to 20 carbon atoms, such as butene-1, pentene-1, hexene-1, and octene-1. For polymers of the present invention it is preferred that unit (1) is present in an amount of at least 75 mole % and more preferable of at least 85 mole %, and most preferably of at least 90 mole %.

The DVB derived units (2) are derived from divinylbenzene or $C_{1-10}$ hydrocarbyl substituted derivatives thereof (2') and include p-divinylbenzene, m-divinylbenzene, o-divinylbenzene, and substituted derivatives thereof. Suitable substituents are methyl, and are preferably substituted at the 2 or 3 position. The polymers according to the present invention may contain units derived from one DVB compound or from a combination of different DVB compounds. According to the present invention those DVB compounds are preferably used that allow easy removal of any unreacted DVB from the polymer. Unreacted DVBs are preferably removed through use of reduced pressure and with heating and combinations thereof and therefore the preferred DVB compounds have relatively low boiling points and/or are easy to separate from other byproducts or solvents or diluents used in the polymerization reaction. DVB compounds are readily available in the form of mixtures of ortho, meta and para divinylbenzene. Preferred DVB compounds contain at least 50 weight % of para- and meta-DVB, more preferably at least 75 weight % of of para- and meta-DVB. Typical impurities which may be contained in technical grades of DVB or DVB mixtures are m- and p-ethyl vinyl benzene, styrene, and polymeric DVBs. Such mixtures can be used in the preparation of the present polymers and in the process of the present invention. Alternatively, such mixtures may be further purified as desired. The polymers of the present invention contain from 0.01 to 5 mole % of DVB units (2), preferably from 0.02 to 4 mole percent and more preferably from 0.05 to 2 mole percent, most preferably up to 1 mole percent.

The polymers of the present invention further contain units (3) derived from ethylene (3'). The inventors have discovered that the use of ethylene in the process is necessary for branching to take place. While not wishing to be bound by any particular theory, the inventors believe that, in the absence of ethylene, and depending on the type of catalyst used, the DVB component may behave as a chain transfer group so that the DVB residue appears predominately at the end of polymer chains leading to terminal vinyl moieties as shown in FIGS. 1A and 1B. The ethylene monomer helps to reinitiate chain propagation after a DVB insertion before chain transfer takes place. The levels of ethylene in the product polymer are from 0.005 up to and including 20 mole percent, generally from 0.01 up to and including 20 mole percent, preferably from 0.05 up to and including 10 mole percent, and most preferably from 0.1 up to and including 10 mole percent. The mole percent values of the units (1), (2), and (3) in the polymer make up 100 percent of the polymers of the present invention.

Preferred polymers according to the present invention comprise at least 85 mole %, more preferably at least 90 mole % of units (1), from 0.02 to 4 mole % and more preferably from 0.05 to 2 mole % of units (2), and 0.05 to 10 mole %, more preferably from 0.1 to 10 mole % of units derived from ethylene.

Highly preferred polymers according to the present invention comprise units (1) derived from propylene or from propylene and one or more alpha-olefins having from 4 to 20 carbon atoms, units (2) derived from p-divinylbenzene, m-divinylbenzene, or o-divinylbenzene, or a mixture of two or more of these, and units (3) derived from ethylene (3'), the polymer comprising at least 85 mole % of units (1), from 0.02 to 4 mole % of units (2), and from 0.05 to 10 mole % of units (3), the polymer having a branching factor, BF, in the range of 0 BF 0.50, and a branching type factor, BTF, in the range 0.01 BTF 50. Among these highly preferred polymers, is a polymer comprising from 97 to 99.5 mole % of units (1), from 0.05 to 0.25 mole % of units (2), and from 0.25 to 2.9 mole % of units (3). These highly preferred polymers combine advantageous properties of a high isotacticity together with a good processability and a high upper use temperature.

The present polymers have characteristics in the melt phase which make them very suitable in melt forming processes, such as required in film, foams, thermoforming, blow molding, and injection molding applications. The polymers of the current invention provide higher melt strength resins which lead to these advantages. In addition the polymers display strain hardening which provide, for example, more stable melt processing, uniform thickness during high draw-down processes, controlled foam expansion, and higher shear thinning at lower melt flow rates.

The polymers of the invention preferably have a weight averaged molecular weight between 20,000 and 4,000,000. The molecular weight distribution (Mw/Mn) for the current polymers can vary within a wide range of typically 1.5 to 20, but preferably is from 1.5 to 5.0. These molecular weights and molecular weight distributions are measured by gel permeation chromatography. For the polymers of the current invention the molecular weight can be modified using process conditions such as temperature, monomer concentration, and the use of hydrogen.

According to another embodiment of the present invention a process is provided for preparing a polymer comprising units (1) derived from an alpha-olefin having at least 3 carbon atoms (1'), units (2) derived from divinylbenzene or $C_{1-10}$ hydrocarbyl substituted derivatives thereof (2'), and units (3) derived from ethylene (3'), by contacting the alpha-olefin (1'), the divinylbenzene compound (2'), and ethylene (3') in the presence of a polymerization catalyst under polymerization conditions wherein the mole ratio of alpha-olefin (1') to divinylbenzene or $C_{1-10}$ hydrocarbyl substituted derivatives thereof (2') is at least 10:1, the mole ratio of divinylbenzene or $C_{1-10}$ hydrocarbyl substituted derivatives thereof (2') to ethylene (3') is in the range of from 1:0.1 to 1:2000, and the mole ratio of alpha-olefin (1') to ethylene (3') is at least 4:1, and preferably at least 10 to 1. This process advantageously produces the polymers according to the present invention.

It is preferred that in the present process an alpha-olefin (1') comprising propylene or propylene with one or more alpha-olefins having from 4 to 20 carbon atoms, a divinylbenzene compound (2') comprising p-divinylbenzene, m-divinylbenzene, or o-divinylbenzene, or a mixture of two or more of these, and ethylene (3') are contacted. More preferably in such a process, the mole ratio of alpha-olefin (1') to divinylbenzene compound (2') is at least 20:1 and the mole ratio of divinylbenzene compound (2') to ethylene (3') is in the range of from 1:0.5 to 1:1000, more preferably from 1:0.5 to 1:50. Highly preferred processes are polymerization processes wherein the polymer is produced in the form of particles. Such process is advantageously, a bulk slurry polymerization process wherein the mole ratio of alpha-olefin (1'), preferably propylene, to divinylbenzene compound (2') is at least 100:1 and the mole ratio of divinylbenzene compound (2') to ethylene (3') is in the range of from 1:0.5 to 1:25, and the mole ratio of alpha-olefin (1') to ethylene (3') is at least 4:1, and preferably at least 10 to 1.

The alpha-olefin (1'), the DVB compound (2') and ethylene (3') are contacted under suitable conditions in the presence of a suitable polymerization catalyst. Suitable polymerization catalysts include any compound or complex of a metal of Groups 3–10 of the Periodic Table of the Elements capable of being activated to polymerize the monomers (1'), (2'), and optionally (3'). Examples include Group 10 diimine derivatives corresponding to the formula:

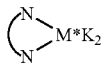

wherein
M* is Ni(II) or Pd(II);
K is halo, hydrocarbyl, or hydrocarbyloxy;
and the two nitrogen atoms are linked by a bridging system.

Such catalysts have been previously disclosed in *J. Am. Chem. Soc.* 118, 267–268 (1996), *J. Am. Chem. Soc.* 117, 6414–6415 (1995), and *Organometallics*, 16, 1514–1516, (1997).

Additional catalysts include derivatives of Group 3, 4, or Lanthanide metals which are in the +2, +3, or +4 formal oxidation state. Preferred compounds include metal complexes containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e.g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzene groups, as well as hydrocarbyl-silyl-(including mono-, di-, or tri(hydrocarbyl)silyl) substituted derivatives thereof. Preferred anionic, delocalized π-bonded groups are cyclopentadienyl, pentamethylcyclopentadienyl, tetramethylcyclopentadienyl, tetramethyl(trimethylsilyl)-cyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

Phosphinimine/cyclopentadienyl complexes are disclosed in EP-A-890581 and correspond to the formula [(R*)$_3$—P=N]$_b$M(Cp)(L$^1$)$_{3-b}$, wherein:

R* is a monovalent ligand, illustrated by hydrogen, halogen, or hydrocarbyl, or two R* groups together form a divalent ligand,
M** is a Group 4 metal,
Cp is cyclopentadienyl, or similar delocalized π-bonded group,
L$^1$ is a monovalent ligand group, illustrated by hydrogen, halogen or hydrocarbyl,
b is a number from 1 to 3; and
n is 1 or 2.

A preferred class of catalysts are transition metal complexes corresponding to the formula:

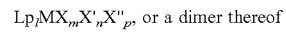

wherein:
Lp is an anionic, delocalized, π-bonded group that is bound to M, containing up to 50 non-hydrogen atoms, optionally two Lp groups may be joined together forming a bridged structure, and further optionally one Lp may be bound to X;
M is a metal of Group 4 of the Periodic Table of the Elements in the +2, +3 or +4 formal oxidation state;
X is an optional, divalent group of up to 50 non-hydrogen atoms that together with Lp forms a metallocycle with M;
X' is an optional neutral ligand having up to 20 non-hydrogen atoms;
X" each occurrence is a monovalent, anionic moiety having up to 40 non-hydrogen atoms, optionally, two X" groups may be covalently bound together forming a divalent dianionic moiety having both valences bound to M, or, optionally 2 X" groups may be covalently bound together to form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;
l is 0, 1 or 2, and most preferably 2;
m is 0 or 1;
n is a number from 0 to 3;
p is an integer from 0 to 3; and
the sum, l+m+p, is equal to the formal oxidation state of M, except when 2 X" groups together form a neutral conjugated or non-conjugated diene that is π-bonded to M, in which case the sum l+m is equal to the formal oxidation state of M.

More preferred complexes include those containing either one or two Lp groups. The latter complexes containing two Lp groups, include those containing a bridging group linking the two Lp groups. Preferred bridging groups are those corresponding to the formula (ER*$_2$)$_x$, B(NR$_2$)$_2$, or BN$_2$)$_2$, wherein E is silicon, germanium, tin, or carbon, R* independently each occurrence is hydrogen or a group selected from silyl, hydrocarbyl, hydrocarbyloxy, and combinations thereof, said R* having up to 30 carbon or silicon atoms, R independently each occurrence is a group selected from silyl, hydrocarbyl, and combinations thereof, said R having up to 30 carbon or silicon atoms, and x is 1 to 8. Preferably, R* independently each occurrence is methyl, ethyl, propyl, benzyl, butyl, phenyl, methoxy, ethoxy, or phenoxy, and R** is methyl, ethyl, propyl, benzyl or butyl.

Examples of the complexes containing two Lp groups are compounds corresponding to the formula:

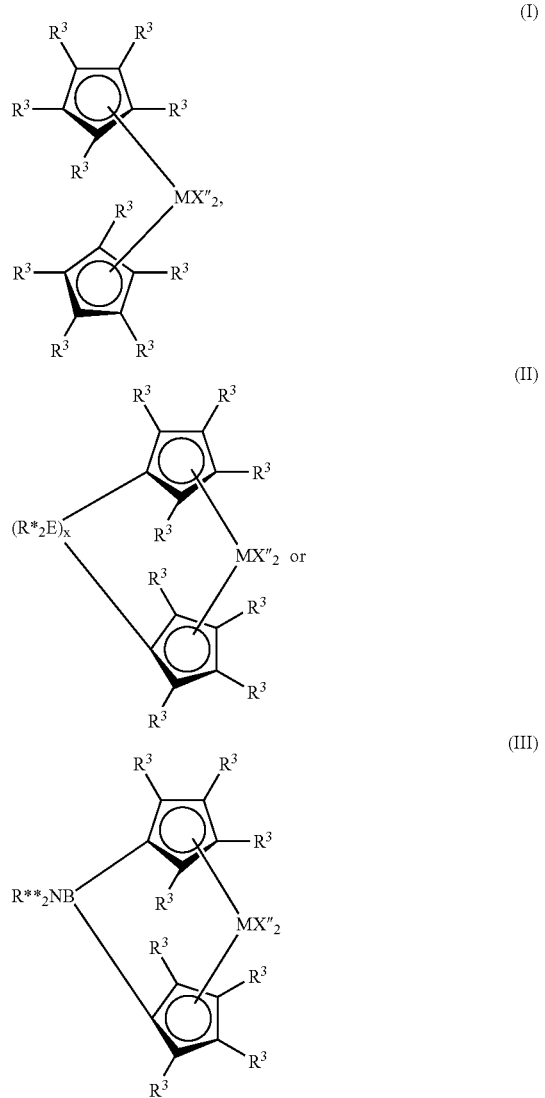

wherein:

M is titanium, zirconium or hafnium, preferably zirconium or hafnium, in the +2 or +4 formal oxidation state;

R$^3$ in each occurrence independently is selected from the group consisting of hydrogen, hydrocarbyl, silyl, germyl, cyano, halo and combinations thereof, said R$^3$ having up to 20 non-hydrogen atoms, or adjacent R$^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, and R*, R**, E and x are as previously defined, preferably (ER*$_2$)$_x$ is dimethylsilandiyl or ethylene, and BNR**$_2$ is di(isopropyl)aminoborandiyl, di(methyl)aminoborandiyl, di(phenyl)aminoborandiyl, di(tolyl)aminoborandiyl.

The foregoing metal complexes are especially suited for the preparation of polymers having stereoregular molecular structure. In such capacity it is preferred that the complex possesses C$_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.* 232, 233–47, (1982).

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)silane, dimethylbis(2-methylinden-1-yl)silane, di(isopropyl)aminobis(cyclopentadien-1-yl)borandiyl, di(isopropyl)aminobis(2-methyl-4-phenylinden-1-yl)borandiyl, di(isopropyl)aminobis(2-methylinden-1-yl)borandiyl, dimethyl(cyclopentadienyl)(fluoren-1-yl)silane, dimethyl(cyclopentadienyl)(octahydrofluoren-1-yl)silane, dimethyl(cyclopentadienyl)(tetrahydrofluoren-1-yl)silane, (1,1,2,2-tetramethy)-1,2-bis(cyclopentadienyl)disilane, (1,2-bis(cyclopentadienyl)ethane, and dimethyl(cyclopentadienyl)-1-(fluoren-1-yl)methane.

Preferred X" groups are selected from hydride, hydrocarbyl, silyl, germyl, balohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are C$_{1-20}$ hydrocarbyl groups.

Complexes containing two Lp groups including bridged complexes suitable for use in the present invention include: bis(cyclopentadienyl)zirconium dimethyl bis(cyclopentadienyl)zirconium dibenzyl, bis(cyclopentadienyl)zirconium methyl benzyl, bis(cyclopentadienyl)zirconium methyl phenyl, bis(cyclopentadienyl)zirconiumdiphenyl, bis(cyclopentadienyl)titanium-allyl, bis(cyclopentadienyl)zirconiummethylmethoxide, bis(cyclopentadienyl)zirconiummethylchloride, bis(pentamethylcyclopentadienyl)zirconiumdimethyl, bis(pentamethylcyclopentadienyl)titaniumdimethyl, bis(indenyl)zirconiumdimethyl, indenylfluorenylzirconiumdimethyl, bis(indenyl)zirconiummethyl(2-(dimethylamino)benzyl), bis(indenyl)zirconiummethyltrimethylsilyl, bis(tetrahydroindenyl)zirconiummethyltrim ethylsilyl, bis(pentamethylcyclopentadienyl)

zirconiummethylbenzyl, bis(pentamethylcyclopentadienyl)zirconiumdibenzyl, bis(pentamethylcyclopentadienyl)zirconiummethylmethoxide, bis(pentamethylcyclopentadienyl)zirconiummethylchloride, bis(methylethylcyclopentadienyl)zirconiumdimethyl, bis(butylcyclopentadienyl)zirconiumdibenzyl, bis(t-butylcyclopentadienyl)zirconiumdimethyl, bis(ethyltetramethylcyclopentadienyl)zirconiumdimethyl, bis(methylpropylcyclopentadienyl)zirconiumdibenzyl, bis(trimethylsilylcyclopentadienyl)zirconiumdibenzyl, dimethylsilyl-bis(cyclopentadienyl)zirconiumdimethyl, dimethylsilyl-bis(tetramethylcyclopentadienyl)titanium (III) allyl dimethylsilyl-bis(t-butylcyclopentadienyl)zirconiumdibenzyl, dimethylsilyl-bis(n-butylcyclopentadienyl)zirconium bis(trimethylsilyl), (methylene-bis(tetramethylcyclopentadienyl)titanium(III) 2-(dimethylamino)benzyl, (methylene-bis(n-butylcyclopentadienyl)titanium(III) 2-(dimethylamino)benzyl, dimethylsilyl-bis(indenyl)zirconiumbenzylchloride, dimethylsilyl-bis(2-methylindenyl)zirconiumdimethyl, dimethylsilyl-bis(2-methyl-4-phenylindenyl)zirconiumdimethyl, dimethylsilyl-bis(2-methylindenyl)zirconium-1,4-diphenyl-1,3-butadiene, dimethylsilyl-bis(2-methyl-4-phenylindenyl)zirconium (II) 1,4-diphenyl-1,3-butadiene, dimethylsilyl-bis(tetrahydroindenyl)zirconium (II) 1,4-diphenyl-1,3-butadiene, di(isopropylamino) borandiylbis(2-methyl-4-phenylindenyl)zirconium dimethyl, dimethylsilyl-bis(tetrahydrofluorenyl)zirconium bis(trimethylsilyl), (isopropylidene)(cyclopentadienyl)(fluorenyl)zirconiumdibenzyl, and dimethylsilyl(tetramethylcyclopentadienyl)(fluorenyl)zirconium dimethyl.

A further class of metal complexes utilized in the present invention corresponds to the preceding formula Lp$_l$MX$_m$X'$_n$X"$_p$, or a dimer thereof, wherein X is a divalent group of up to 50 non-hydrogen atoms that together with Lp forms a metallocycle with M.

Preferred divalent X groups include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

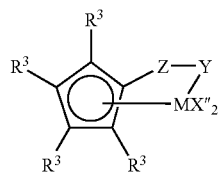

wherein:

M is titanium or zirconium, preferably titanium in the +2, +3, or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a halo, hydrocarbyl, hydrocarbyloxy or silyl group, said group having up to 20 non-hydrogen atoms, or two X" groups together form a neutral $C_{5-30}$ conjugated diene or a divalent derivative thereof;

Y is —O—, —S—, —NR*—, —PR*—; and

Z is SiR*$_2$, CR*$_2$, SiR*$_2$SiR*$_2$, CR*$_2$CR*$_2$, CR*=CR*, CR*$_2$SiR*$_2$, GeR*$_2$, or B(NR**$_2$) wherein R* and R** are as previously defined.

Most highly preferred metal complexes for use herein are the following metal complexes: dimethylsilanebis(inden-1-yl)zirconium dimethyl, dimethylsilanebis(inden-1-yl)zirconium(II) 1,3-pentadiene, dimethylsilanebis(inden-1-yl)zirconium(II) 1,4 diphenyl-1,3-butadiene, dimethylsilanebis(2-methyl-4-phenylinden-1-yl)zirconium dimethyl, dimethylsilanebis(2-methyl-4-phenylinden-1-yl)zirconium (II) 1,3-pentadiene, and dimethylsilanebis(2-methyl-4-phenylinden-1-yl)zirconium(II) 1,4 diphenyl-1,3-butadiene.

Another class of metal complexes utilized in the present invention are nonmetallocene, single-site metal-ligand complexes such as disclosed in WO-02/38628. These metal ligand complexes are generally obtained by mixing a monoanionic ligand having an amine and a heteroaryl or substituted heteroaryl group with a suitable metal precursor compound prior to or simultaneously with allowing the mixture to be contacted with reactants (e.g., monomers). The nonmetallocene, single-site ligands may be characterized by the following general formula:

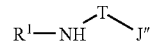

wherein $R^1$ is very generally selected from the group consisting of alkyl, substituted alkyl, cycloalkyl, substituted cycloalkyl, heteroalkyl, substituted heteroalkyl, heterocycloalkyl, substituted hetercycloalkyl, aryl, substituted aryl, heteroaryl, substituted heteroaryl and combinations thereof. In many embodiments, $R^1$ is a ring having from 4–8 atoms in the ring generally selected from the group consisting of substituted cycloalkyl, substituted heterocycloalkyl, substituted aryl and substituted heteroaryl, such that $R^1$ may be characterized by the general formula:

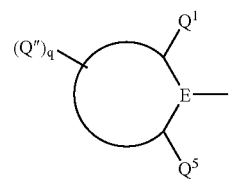

where $Q^1$ and $Q^5$ are substituents on the ring ortho to atom E, with E being selected from the group consisting of carbon and nitrogen and with at least one of $Q^1$ or $Q^5$ being bulky (defined as having at least 2 atoms). $Q^1$ and $Q^5$ are independently selected from the group consisting of alkyl, substituted alkyl, cycloalkyl, substituted cycloalkyl, aryl, substituted aryl and silyl, but provided that $Q^1$ and $Q^5$ are not both methyl. Q"$_q$ represents additional possible substituents on the ring, with q being 1, 2, 3, 4 or 5 and Q" being selected from the group consisting of hydrogen, alkyl, substituted alkyl, cycloalkyl, substituted cycloalkyl, heteroalkyl, substituted heteroalkyl, heterocycloalkyl, substituted hetercycloalkyl, aryl, substituted aryl, heteroaryl, substituted heteroaryl, alkoxyl, aryloxyl, silyl, boryl, phosphino, amino, thio, seleno, halide, nitro, and combinations thereof. T is a bridging group selected group consisting of —CR$^2$R$^3$— and —SiR$^2$R$^3$— with R$^2$ and R$^3$ being independently selected from the group consisting of hydrogen, alkyl, substituted alkyl, cycloalkyl, substituted cycloalkyl, heteroalkyl, substituted heteroalkyl, heterocycloalkyl, substituted hetercycloalkyl, aryl, substituted aryl, heteroaryl, substituted heteroaryl, alkoxyl, aryloxyl, silyl, boryl, phosphino, amino, thio, seleno, halide, nitro, and combinations thereof. J" is generally selected from the group consisting of heteroaryl and substituted heteroaryl. Specific examples of these ligands and methods of their preparation are disclosed in WO-02/38628.

The desired ligand is combined with a metal atom, ion, compound or other metal precursor compound. For example, the ligand may be added to a reaction vessel at the same time as the metal or metal precursor compound along with the reactants, activators, scavengers, etc. Additionally, the ligand can be modified prior to addition to or after the addition of the metal precursor, e.g. through a deprotonation reaction or some other modification. One class of suitable metal precursor compounds may be characterized by the general formula M(L)$_n$ where M is hafnium or zirconium and each L is independently selected from the group consisting of halide (F, Cl, Br, I), alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations thereof. n is 4 typically. It is well known that hafnium metal typically contains some amount of impurity of zirconium. Specific examples of suitable hafnium and zirconium precursors include, but are not limited to HfCl$_4$, Hf(CH$_2$Ph)$_4$, Hf(CH$_2$CMe$_3$)$_4$, Hf(CH$_2$SiMe$_3$)$_4$, Hf(CH$_2$Ph)$_3$Cl, Hf(CH$_2$CMe$_3$)$_3$Cl, Hf(CH$_2$SiMe$_3$)$_3$Cl, Hf(CH$_2$Ph)$_2$Cl$_2$, Hf(CH$_2$CMe$_3$)$_2$Cl$_2$, Hf(CH$_2$SiMe$_3$)$_2$Cl$_2$, Hf(NMe$_2$)$_4$, Hf(NEt$_2$)$_4$, and Hf(N(SiMe$_3$)$_2$)$_2$Cl$_2$; ZrCl$_4$, Zr(CH$_2$Ph)$_4$, Zr(CH$_2$CMe$_3$)$_4$, Zr(CH$_2$SiMe$_3$)$_4$, Zr(CH$_2$Ph)$_3$Cl, Zr(CH$_2$CMe$_3$)$_3$Cl, Zr(CH$_2$SiMe$_3$)$_3$Cl, Zr(CH$_2$Ph)$_2$Cl$_2$, Zr(CH$_2$CMe$_3$)$_2$Cl$_2$, Zr(CH$_2$SiMe$_3$)$_2$Cl$_2$, Zr(NMe$_2$)$_4$, Zr(NEt$_2$)$_4$, Zr(NMe$_2$)$_2$Cl$_2$, Zr(NEt$_2$)$_2$Cl$_2$, and Zr(N(SiMe$_3$)$_2$)$_2$Cl$_2$. Lewis base adducts of these examples are also suitable as hafnium precursors, for example, ethers, amines, thioethers, phosphines and the like are suitable as Lewis bases.

The ligand to metal precursor compound ratio is typically in the range of about 0.01:1 to about 100:1, more preferably in the range of about 0.1:1 to about 10:1.

When the ligand is mixed with the metal precursor compound, a metal-ligand complex may be formed, which may be a catalyst or may need to be activated to be a catalyst. The metal-ligand complexes discussed herein are referred to as 2,1 complexes or 3,2 complexes, with the first number representing the number of coordinating atoms and second number representing the charge occupied on the metal. The 2,1 complexes therefore have two coordinating atoms and a single anionic charge. Other embodiments of this invention are those complexes that have a general 3,2 coordination scheme to a metal center, with 3,2 referring to a ligand that occupies three coordination sites on the metal and two of those sites being anionic and the remaining site being a neutral Lewis base type coordination.

Looking first at the 2,1 the nonmetallocene, single-site metal-ligand complexes, the metal-ligand complexes may be characterized by the following general formula:

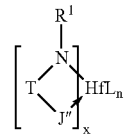

wherein T, J", R$^1$, L, x is 1 or 2, and n is typically 3 (for x is 1) or and n is typically 1 or 2 (for x is 2). The J" heteroaryl may or may not datively bond, but is drawn as bonding.

Turning to the 3,2 metal-ligand nonmetallocene, single-site complexes used in the practice of this invention, the metal-ligand complexes may be characterized by the general formula:

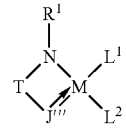

where M is zirconium or hafnium;

R$^1$ and T are defined above;

J'" being selected from the group of substituted heteroaryls with 2 atoms bonded to the metal M, at least one of those 2 atoms being a heteroatom, and with one atom of J'" is bonded to M via a dative bond, the other through a covalent bond; and L$^1$ and L$^2$ are independently selected from the group consisting of halide, allyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations thereof.

More specific embodiments of the nonmetallocene single site metal-ligand complexes as well as their preparation methods are disclosed in WO-02/8628. These complexes are usually catalytically inactive in the absence of a cocatalyst or other activating technique. However, not all suitable catalysts are catalytically inactive without a cocatalyst.

In the process of the present invention, the above-mentioned catalyst compounds and complexes preferably are rendered catalytically active by combination with an activating cocatalyst or use of an activating technique, such as those that are previously known in the art for use with transition metal olefin polymerization complexes. Suitable activating cocatalysts for use herein include polymeric or oligomeric alumoxanes, especially methylalumoxane, triisobutyl aluminum modified methylalumoxane, or isobutylalumoxane; neutral Lewis acids, such as C$_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium salts of compatible, noncoordinating anions; bulk electrolysis (explained in more detail hereinafter); and combinations of the foregoing activating cocatalysts and techniques. A preferred ion forming compound is a tri($C_{1-20}$-hydrocarbyl)ammonium salt of a tetrakis(substituted aryl)borate, especially a tetrakis(pentafluorophenyl) borate. The foregoing activating cocatalysts and activating techniques have been previously taught with respect to different metal complexes in the following references: EP-A-277,003, U.S. Pat. No. 5,153,157, U.S. Pat. No. 5,064, 802, U.S. Pat. No. 5,321,106, U.S. Pat. No. 5,721,185, U.S. Pat. No. 5,350,723, U.S. Pat. No. 5,425,872, U.S. Pat. No. 5,625,087, U.S. Pat. No. 5,883,204, U.S. Pat. No. 5,919,983, U.S. Pat. No. 5,783,512, WO 96/28480, WO 99/15534, and WO99/42467.

Combinations of neutral Lewis acids, especially the combination of a trialkylaluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane are especially desirable activating cocatalysts. Preferred molar ratios of Group 4 metal complex:tris(pentafluoro-phenyl)borane:alumoxane are from 1:1:1 to 1:10:30, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gallium, niobium or tantalum. Suitable metalloids include, but are not limited to, boron, phosphorus, and silicon. Compounds containing-anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)_d^+(A)^{d-}$$

wherein:
L* is a neutral Lewis base;
$(L^*-H)^+$ is a conjugate Bronsted acid of L*;
$A^{d-}$ is a noncoordinating, compatible anion having a charge of d−, and
d is an integer from 1 to 3.
More preferably $A^{d-}$ corresponds to the formula: $[M'Q_4]^-$;

wherein:
M' is boron or aluminum in the +3 formal oxidation state; and
Q independently each occurrence is selected from hydride, dialkylamido, halide, hydrocarbyl, substituted hydrocarbyl hydrocarbyloxide, halo-substituted hydrocarbyl, halo-substituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$$(L^*-H)^+(BQ_4)^-;$$

wherein:
L* is as previously defined;
B is boron in a formal oxidation state of 3; and
Q is a hydrocarbyl-, hydrocarbyloxy-, fluorohydrocarbyl-, fluorohydrocarbyloxy-, hydroxyhydrocarbyl-, dihydrocarbylaluminumoxyhydrocarbyl-, or fluorinated silylhydrocarbyl-group of up to 20 nonhydrogen atoms. In an even more preferred embodiment, in at least one, and preferably each, occurrence Q is a partially or completely fluorinated aryl group, especially, a pentafluorophenyl group.

Preferred Lewis base salts are tri- and disubtituted ammonium and phosphonium salts, disusbstituted oxonium and sulfonium salts, more preferably trialkyl-ammonium- or dialkylarylammonium-salts containing one or more $C_{12-40}$ alkyl groups. The latter cocatalysts have been found to be particularly suitable for use in combination the transition metal compounds and complexes.

Preferred trialkylammonium cations are methyldioctadecylammonium and dimethyloctadecylammonium. The use of the above Bronsted acid salts as activating cocatalysts for addition polymerization catalysts is known in the art, having been disclosed in U.S. Pat. Nos. 5,064,802, 5,919,983, 5,783,512, WO-96/28480, and elsewhere. Preferred dialkylarylammonium cations are fluorophenyldioctadecylammonium-, perfluoro-phenyldioctacecylammonium- and p-trifluoromethylphenyldi(octadecyl)ammonium cations. It should be noted that certain of the cocatalysts, especially those containing a hydroxyphenyl ligand in the borate anion, may require the addition of a Lewis acid, especially a trialkylaluminum compound, to the polymerization mixture or the catalyst composition, in order to form the active catalyst composition, as taught in U.S. Pat. No. 5,783,512 and WO-96/28480.

Another suitable ion forming, activating cocatalyst comprises a salt of a cationic oxidizing agent and a noncoordinating, compatible anion represented by the formula:

$$(OX^{e+})_d(A^{d-})_e$$

wherein:
$Ox^{e+}$ is a cationic oxidizing agent having a charge of e+;
e is an integer from 1 to 3; and
$A^{d-}$ and d are as previously defined.

Examples of cationic oxidizing agents include: ferrocenium, hydrocarbyl-substituted ferrocenium, $Ag^+$ or $Pb^{+2}$. Preferred embodiments of $A^{d-}$ are those anions previously defined with respect to the Bronsted acid containing activating cocatalysts, especially tetrakis(pentafluorophenyl) borate. The use of the above salts as activating cocatalysts for addition polymerization catalysts is known in the art, having been disclosed in U.S. Pat. No. 5,321,106.

Another suitable ion forming, activating cocatalyst comprises a compound which is a salt of a carbenium ion and a noncoordinating, compatible anion represented by the formula:

$$\copyright^+ A^-$$

wherein:
$\copyright^+$ is a $C_{1-20}$ carbenium ion; and
$A^-$ is as previously defined. A preferred carbenium ion is the trityl cation, that is triphenylmethylium. The use of the above carbenium salts as activating cocatalysts for addition polymerization catalysts is known in the art, having been disclosed in U.S. Pat. No. 5,350,723.

A further suitable ion forming, activating cocatalyst comprises a compound which is a salt of a silylium ion and a noncoordinating, compatible anion represented by the formula:

$$R^3{}_3Si(X')_q{}^+A^-$$

wherein:
$R^3$ is $C_{1-10}$ hydrocarbyl, and X', q and $A^-$ are as previously defined.

Preferred silylium salt activating cocatalysts are trimethylsilylium tetralkspentafluorophenylborate, triethylsilylium tetrakispentafluorophenylborate and ether substituted adducts thereof. The use of the above silylium salts as activating cocatalysts for addition polymerization catalysts is known in the art, having been disclosed in U.S. Pat. No. 5,625,087.

Certain complexes of alcohols, mercaptans, silanols, and oxines with trispentafluorophenyl)borane are also effective catalyst activators and may be used according to the present invention. Such cocatalysts are disclosed in U.S. Pat. No. 5,296,433.

Another class of suitable catalyst activators, disclosed in WO99/42467, are expanded anionic compounds corresponding to the formula: $(A^{1+a^1})_{b^1}(Z^1J^1{}_{j^1})^{-c^1}{}_{d^1}$, wherein:
$A^1$ is a cation of charge $+a^1$,
$Z^1$ is an anion group of from 1 to 50, preferably 1 to 30 atoms, not counting hydrogen atoms, further containing two or more Lewis base sites;
$J^1$ independently each occurrence is a Lewis acid coordinated to at least one Lewis base site of $Z^1$, and optionally two or more such $J^1$ groups may be joined together in a moiety having multiple Lewis acidic functionality,
$j^1$ is a number from 2 to 12 and $a^1$, $b^1$, $c^1$, and $d^1$ are integers from 1 to 3, with the proviso that $a^1 \times b^1$ is equal $c^1 \times d^1$.

The foregoing cocatalysts (illustrated by those having imidazolide, substituted imidazolide, imidazolinide, substituted imidazolinide, benzimidazolide, or substituted benzimidazolide anions) may be depicted schematically as follows:

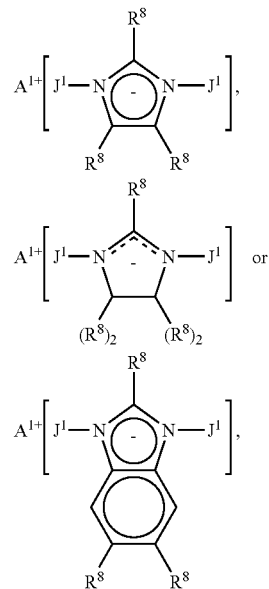

wherein:
$A^{1+}$ is a monovalent cation as previously defined, and preferably is a trihydrocarbyl ammonium cation, containing one or two $C_{10-40}$ alkyl groups, especially the methylbis (tetradecyl)ammonium- or methylbis(octadecyl)ammonium-cation, $R^8$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $J^1$ is tris(pentafluorophenyl)borane or tris(pentafluorophenyl)aluminane.

A further class of suitable activating cocatalysts include cationic Group 13 salts corresponding to the formula:

$$[M''Q^1{}_2L^1{}_{1'}]^+(Ar^f{}_3M'Q^2)^-$$

wherein:
M" is aluminum, gallium, or indium;
M' is boron or aluminum;
$Q^1$ is $C_{1-20}$ hydrocarbyl, optionally substituted with one or more groups which independently each occurrence are hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, or hydrocarbylsulfido groups having from 1 to 20 atoms other than hydrogen, or, optionally, two or more $Q^1$ groups may be covalently linked with each other to form one or more fused rings or ring systems;
$Q^2$ is an alkyl group, optionally substituted with one or more cycloalkyl or aryl groups, said $Q^2$ having from 1 to 30 carbons;

L' is a monodentate or polydentate Lewis base, preferably L' is reversibly coordinated to the metal complex such that it may be displaced by an olefin monomer, more preferably L' is a monodentate Lewis base;

l' is a number greater than zero indicating the number of Lewis base moieties, L', and $Ar^f$ independently each occurrence is an anionic ligand group; preferably $Ar^f$ is selected from the group consisting of halide, $C_{1-20}$ halohydrocarbyl, and $Q^1$ ligand groups, more preferably $Ar^f$ is a fluorinated hydrocarbyl moiety of from 1 to 30 carbon atoms, most preferably $Ar^f$ is a fluorinated aromatic hydrocarbyl moiety of from 6 to 30 carbon atoms, and most highly preferably $Ar^f$ is a perfluorinated aromatic hydrocarbyl moiety of from 6 to 30 carbon atoms.

Examples of the foregoing Group 13 metal salts are alumicinium tris(fluoroaryl)borates or gallicinium tris(fluoroaryl)borates corresponding to the formula: $[M''Q^1{}_2L'{}_{l'}]^+ (Ar^f{}_3BQ^2)^-$, wherein M" is aluminum or gallium; $Q^1$ is $C_{1-20}$ hydrocarbyl, preferably $C^{1-8}$ alkyl; $Ar^f$ is perfluoroaryl, preferably pentafluorophenyl; and $Q^2$ is $C_{1-8}$ alkyl, preferably $C_{1-8}$ alkyl. More preferably, $Q^1$ and $Q^2$ are identical $C_{1-8}$ alkyl groups, most preferably, methyl, ethyl or octyl.

The foregoing activating cocatalysts may also be used in combination. An especially preferred combination is a mixture of a tri(hydrocarbyl)aluminum or tri(hydrocarbyl)borane compound having from 1 to 4 carbons in each hydrocarbyl group or an ammonium borate with an oligomeric or polymeric alumoxane compound. The expanded anion cocatalysts may also be used in combination with an oligomeric or polymeric alumoxane compound, a tri(hydrocarbyl)aluminum compound, a di(hydrocarbyl)(hydrocarbyloxy)aluminum compound, a di(hydrocarbyl)(dihydrocarbyl-amido)aluminum compound, a bis(dihydrocarbyl-amido)(hydrocarbyl)aluminum compound, a di(hydrocarbyl)amido(disilyl)aluminum compound, a di(hydrocarbyl)-amido(hydrocarbyl)(silyl)aluminum compound, a bis(dihydrocarbylamido)(silyl)aluminum compound, or a mixture of the foregoing compounds, having from 1 to 20 non-hydrogen atoms in each hydrocarbyl, hydrocarbyloxy, or silyl group, if desired. These aluminum compounds are usefully employed for their beneficial ability to scavenge impurities such as oxygen, water, and aldehydes from the polymerization mixture as well as to react with the hydroxyl group or quiescent reactive functionality of the compounds or the reactive derivatives thereof.

Preferred aluminum compounds include $C_{1-20}$ trialkyl aluminum compounds, especially those wherein the alkyl groups are ethyl, propyl, isopropyl, n-butyl, isobutyl, pentyl, neopentyl, or isopentyl, dialkyl(aryloxy)aluminum compounds containing from 1–6 carbons in the alkyl group and from 6 to 18 carbons in the aryl group (especially (3,5-di(t-butyl)4-methylphenoxy)diisobutylaluminum), methylalumoxane, modified methalumoxane, especially isobutyl modified alumoxane, and tri(ethylaluminum), tris(pentafluorophenyl)borane-, or trispentafluorophenyl)aluminum-modified alumoxanes or supported derivatives thereof. (The latter compositions are previously known, having been disclosed in WO99/15534). Additional species include mixtures of aluminum containing Lewis acids as disclosed in U.S. Pat. Nos. 6,211,111 and 6,214,760.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of form 0.5:1 to 10:1, more preferably from 1:1 to 6:1 most preferably from 1:1 to 5:1. The remaining activating cocatalysts are generally employed in approximately equimolar quantity with the metal complex. In general, the polymerization process may be accomplished at conditions well known in the prior art for Ziegler-Natta or Kaminsky-Sinn type polymerization reactions, that is, temperatures from 0–250° C., preferably 30 to 200° C. and pressures from atmospheric to 10,000 atmospheres. Suspension, solution, slurry, gas phase, solid state powder polymerization or other process condition may be employed if desired.

A support, especially silica, alumina, or a polymer (especially poly(tetrafluoroethylene) or a polyolefin) may be employed, and desirably is employed when the process is a gas phase or slurry polymerization process. The support is preferably employed in an amount to provide a weight ratio of catalyst (based on metal):support from $1:10^6$ to $1:10^3$, more preferably from $1:10^6$ to $1:10^4$.

Preferably for use in gas phase polymerization processes, a supported catalyst has a median particle diameter from about 20 to about 200 µm, more preferably from about 30 µm to about 150 µm, and most preferably from about 50 µm to about 100 µm. Preferably for use in slurry polymerization processes, the supported catalyst has a median particle diameter from about 1 µm to about 200 µm, more preferably from about 5 µm to about 100 µm, and most preferably from about 10 µm to about 80 µm.

In most polymerization reactions the molar ratio of catalyst:polymerizable compounds employed is from $10^{-12}:1$ to $10^{-1}:1$, more preferably from $10^{-9}:1$ to $10^{-5}:1$.

Suitable solvents use for solution polymerization are liquids that are substantially inert under process conditions encountered in their usage. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and alkyl-substituted aromatic compounds such as benzene, toluene, xylene, and ethylbenzene. Suitable solvents also include liquid alpha-olefins having at least 3 carbon atoms which may act as monomers.

The catalyst composition used in the preparation of the polymers of the present invention may be prepared as a homogeneous catalyst by addition of the requisite components to a solvent or diluent in which polymerization will be conducted. The catalyst composition may also be prepared and employed as a heterogeneous catalyst by adsorbing, depositing or chemically attaching the requisite components on an inorganic or organic particulated solid. Examples of such solids include, silica, silica gel, alumina, clays, expanded clays (aerogels), aluminosilicates, trialkylaluminum compounds, and organic or inorganic polymeric materials, especially polyolefins. In a preferred embodiment, a heterogeneous catalyst is prepared by reacting an inorganic compound, preferably a tri($C_{1-4}$ alkyl)aluminum compound, with an activating cocatalyst, especially an ammonium salt of a hydroxyaryl(trispentafluorophenyl)borate, such as an ammonium salt of (4-hydroxy-3,5-ditertiarybutylphenyl)tris(pentafluorophenyl)borate or (4-hydroxyphenyl)-tris(pentafluorophenyl)borate. This activating cocatalyst is deposited onto the support by coprecipitating, imbibing, spraying, or similar technique, and thereafter removing any solvent or diluent. The metal complex is added to the support, also by adsorbing, depositing or chemically attaching the same to the support, either subsequently, simultaneously or prior to addition of the activating cocatalyst.

In the preferred particle forming process, i.e. a slurry or gas phase polymerization process, more preferably a slurry process, the catalyst composition is employed in heterogeneous or supported form. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent Likewise, the α-olefin monomer or a mixture of different α-olefin monomers (1') may preferably be used in whole or part as the liquid diluent. Most preferably, at least a major part of the diluent comprises the α-olefin having at least three carbon atoms monomer or monomers to be polymerized. A dispersant, particularly an elastomer, may be dissolved in the diluent utilizing techniques known in the art, if desired.

The preferred slurry process is carried out at temperatures of from about 0° C. up to a temperature just below the temperature at which the resulting polymer becomes substantially soluble in the inert polymerization medium. Preferred temperatures are from about 0° C. up to about 90° C., more preferably up to about 75° C. The solution process is carried out at temperatures from the temperature at which the resulting polymer is soluble in an inert solvent up to about 275° C. Preferably, solution polymerization temperatures range from about 75° C., more preferably from about 80° C., to about 200° C., more preferably to about 160° C. The solution and slurry processes are usually carried out at pressures between about 1 to 100 bar. Typical operating conditions for gas phase polymerizations are from 20° C. to 90° C., more preferably from 20° C. to 75° C. In gas phase processes the pressure is typically from subatmospheric to 100 bar. It is preferred that in the process of the present invention the polymer is prepared in the form of particles, i.e. in a gas phase or slurry process, or dissolved in a polymerization diluent, i.e. in a solution or high pressure process, and more preferably that the polymer is prepared in the form of a slurry of particles in a polymerization diluent.

The polymerization catalyst can be used as such or after being subjected to prepolymerization. The prepolymerization can be carried out by any known methods such as by bringing a small amount of one or more polymerizable monomers into contact with the catalyst. The monomers which can be used in the prepolymerization are not particularly limited and include the monomers (1'), (2'), and (3'). It is preferable to use for the prepolymerization the same monomers as used in the subsequent polymerization. The prepolymerization temperature may usually range from −20° C. to 100° C., preferably from −10 to 70° C., more preferably from 0 to 50° C.

The prepolymerization may be carried out batchwise or continuously under atmospheric pressure or elevated pressures. The prepolymerization may be carried out in the presence of a molecular weight controlling agent such as hydrogen. The prepolymerization is carried out in the absence or presence of a solvent or diluent. When a solvent or diluent is used it is preferably an inert hydrocarbon, such as the ones described with respect to the polymerization process. The prepolymerization is typically carried out to form a solid prepolymerized catalyst, i.e. polymer is formed on the catalyst particles, having from 0.1 to 100 g of polymer per 1 g of solid catalyst, preferably from 1 to 10 g of polymer per g of catalyst composition. Typical particle sizes of prepolymerized catalysts are in the range of 1 to 200 μm, preferably in the range from 10 to 100 μm.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of an dry, inert gas, such as, for example, nitrogen.

The polymerization may be carried out as a batchwise or a continuous polymerization process. A continuous process is preferred, in which event catalyst, monomers, and optionally solvent, are continuously supplied to the reaction zone, and polymer product continuously removed therefrom.

Without limiting in any way the scope of the invention, one means for carrying out such a polymerization process is as follows: In a stirred-tank reactor, the monomers to be polymerized are introduced continuously, together with solvent or diluent and an optional chain transfer agent. The reactor contains a liquid phase composed substantially of monomers, together with any solvent or additional diluent and dissolved polymer or polymer in particle form. Catalyst and cocatalyst, optionally on a support, are continuously introduced in the reactor liquid phase. The reactor temperature and pressure may be controlled by adjusting the solvent/monomer ratio, the catalyst addition rate, as well as by cooling or heating coils, jackets or both. The polymerization rate is controlled by the rate of catalyst addition. Within the monomer mole ratios to be used in the process of the present invention, the content of units (1), (2) and (3) in the polymer product is determined by the relative ratios of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent, such as a stream of hydrogen introduced to the reactor, as is well known in the art. The reactor effluent is contacted with a catalyst kill agent such as water. The polymer solution or polymer slurry is optionally heated, and the polymer product is recovered by flashing off gaseous monomers as well as residual solvent or diluent at reduced pressure, and, if necessary, conducting further devolatilization in equipment such as a devolatilizing extruder. In a continuous process the mean residence time of the catalyst and polymer in the reactor generally is from about 5 minutes to 8 hours, and preferably from 10 minutes to 6 hours.

Further, antistatic agents may be introduced into the reactor to prevent agglomeration or sticking of polymer or catalyst to the reactor walls.

The polymers that are prepared according to such polymerization process may be combined with any conventional additives, such as UV stabilizers, antioxidants, anti-slip or anti-blocking agents, which may be added in conventional ways, for example, downstream of the polymerization reactor, or in an extrusion or molding step.

Blends which comprise any polymer of the invention with at least one additional polymer are also aspects of the invention. The polymers of the present invention can be mixed with other thermoplastic resin and then used. Examples of other thermoplastic resins include polyolefin resins, polystyrene resins, condensation series high-molecular weight polymers and addition polymerization series high-molecular weight polymers. Typical examples of the polyolefin resins include high-density polyethylenes, low-density polyethylenes, poly-3-methylbutene-1, poly-4-methylpentene-1, straight-chain low-density polyethylenes obtained by the use of 1-butene, 1-hexene, 1-octene, 4-methylpentene-1 and 3-methylbutene-1 as comonomer components, ethylene-vinyl acetate copolymers, saponified ethylene-vinyl acetate copolymers, ethylene-acrylic acid copolymers, ethylene-acrylic acid ester copolymers, ethylenic ionomers and polypropylene. Typical examples of the polystyrene resins include general-purpose polystyrenes, isotactic polystyrenes and (rubber modified) high-impact polystyrenes. Typical examples of the condensation series high-molecular weight polymers include polyacetal resins, polycarbonate resins, polyamide resins such as 6-nylon and 6,6-nylon, polyester resins such as polyethyl-ene terephthalates and polybutylene terephthalates, polyphenylene oxide resins, polyimide resins, polysulfone resins, polyethersulfone resins and polyphenylene sulfide resins. Examples of the addition polymerization series high-molecular weight polymers include polymers obtained from polar vinyl monomers and polymers obtained from diene monomers, typically, polymethyl methacrylate, polyacrylonitrile, acrylonitrile-butadiene copolymer, acrylonitrile-butadiene-styrene copolymer, diene polymers in which a diene chain is hydrogenated, and thermoplastic elastomers. Among these thermoplastic resins, the polyolefin resins are suitable.

The present invention includes any article which is thermoformed, injection molded, extruded, cast, blow molded, blown, foamed or molded articles of any polymer composition of the invention or prepared by a process of the invention. Particularly preferred is any article which is a foam, film or fiber.

The polymers of the present invention and compositions including them preferably have improved melt strength and are, therefore, very desirable for molding operations where higher melt strength is advantageous such as injection blow molding, high-speed extrusion coating, thermoforming, films, foams, profile extrusion and multilayer co-extrusion all of which are within the skill in the art.

Next the present invention will be described in more detail with respect to examples.

EXAMPLES

The methods used to determine the properties of the polymers of the present invention were as follows.

It is well known to use NMR spectroscopic methods for determining polymer composition. ASTM D 5017-91, J. C. Randall et al., in "NMR and macromolecules". ACS Symposium series 247, J. C. Randall, Ed., Am. Chem. Soc., Washington, D.C., 1984, Chap. 9, and J. C. Randall in "Polymer Sequence Determination", Academic Press, New-York (1977) provide general methods of polymer analysis by NMR spectroscopy. Methods for determining the composition of olefinic copolymers such as copolymers of propylene and ethylene are described in for example Kakugo et al., Macromol., Vol 15, 1150 (1982), Kang-Bong Lee et al., Polymer Journal, Vol. 28, No. 8, pp. 696–702 (1996), and Hanson E. W. et al., Polymer Volume 37, number 1, 1996, 19–24.

The following method is used to determine the monomer content of the polymers of the present invention. The method of Kang-Bong Lee is used to determine preliminary mole fractions of propylene, [$P_c$], and ethylene, [$E_c$]. A value Y is defined as equal to [$E_c$]·(X/[$P_c$]) and where X is equal to the integral region in the carbon-13 NMR spectrum of the polymer from 16–22.7 ppm. The relative monomer compositions in the polymers can then be calculated as follows: propylene=X, ethylene=(Y+A) and DVB=(A+B+Z−D)/2, where A, B and D are as previously defined and Z is the integral region in the carbon-13 NMR spectrum of the polymer from 135–139 ppm. The relative amounts of monomers are normalized to unity which gives monomer mole fractions or percentages. When monomer unit 1' consists of another alpha-olefin other than propylene or a mixture of alpha-olefins, one skilled in the art will make adjustments to this method to include compositions of the other alpha-olefins.

The determination of the DVB content as given above is based the consideration that the mole fraction of DVB in the polymer is related to the sum of all ipso carbons divided by 2. An ipso carbon in the polymer is an aromatic carbon atom with no hydrogens (attached to a hydrocarbyl group). All the ipso carbons in the polymer come from divinylbenzene and each divinylbenzene contributes 2 ipso carbons. In the carbon-13 NMR spectrum, integral regions A and B are due to ipso carbons a and b in FIG. 1. If some unsaturation is left in the polymer, such as in FIG. 1A and FIG. 1B, peaks in integral regions Z and D will appear. The difference Z–D should be included for determining the DVB content.

The tacticity of the propylene based polymers was determined according to the method of Randall and is quoted as the fraction of the mm triad of the normalized total triads, summed to unity, of the propyl methyl carbons in the carbon-13 NMR spectrum from 16–22.7 ppm. The mm triad integral region has a chemical shift range of 21.28–22.7 ppm.

The intrinsic viscosity data of FIG. 2 was collected using a GPC-multidetector method such as described in Macromolecules 2000, 33, pages 7489–7499 which is incorporated by reference. The linear standard used for the measurement of these polymers was Profax* 6323, a commercial general purpose homopolypropylene material available from Basel (Profax is a Trademark of Basell).

Strain hardening in uniaxial extensional flow is a metric used in the art such as in WO-99/10424. The tensile stress growth coefficient $\eta_E^+$ is a measure of the resistance of a fluid or semifluid to uniaxial extensional flow and can be computed from measurements of stress and strain of a thermoplastic melt when subjected to tensile strain at a constant rate and temperature. Measuring this property is within the skill in the art. One instrument and measurement procedure is described by J. Meissner in Proc. XIIth International Congress on Rheology, Quebec, Canada, August 1996, pages 7–10 and by J. Meissner and J. Hostettler, Rheol. Acta, 33, 1–21 (1994). A commercial instrument for the measurements is the Elongational Rheometer for Melts (RUE) commercially available from Rheometric Scientific.

The melting points of the polymers were determined by Differential Scanning Calorimetry.

The weight averaged molecular weight (MW) and molecular weight distribution (MWD) were determined by Gel Permeation Chromatography using polystyrene standards.

Catalyst Preparations

Catalyst A:

Under an argon atmosphere, a 1.00 ml toluene solution of 0.2139M triethylaluminum was added to a toluene solution of di(octadecyl)methyl ammonium [tris(pentafluorophenyl) (p-phenol)borane], [H(C$_{18}$H$_{35}$)$_2$(CH$_3$)N]$^+$[B(C$_6$H$_4$-p-OH) (C$_6$F$_5$)$_3$]$^-$, 2.55 ml (0.0759M) and stirred for 5 minutes. 3.30 ml of this toluene solution of [H(C$_{18}$H$_{35}$)$_2$(CH$_3$)N]$^+$[B (C$_6$H$_4$-p-OAl(Et)$_2$)(C$_6$F$_5$)$_3$]$^-$, was added to 3.00 g of triethylaluminum (TEA)-treated silica (a 40 micron granular silica available from Grace-Davison Company, calcined at 250° C.

for 3 h, treated with 2.5 mmol TEA/g of silica, washed with hexanes and dried under reduced pressure). The mixture was shaken by hand to break-up clumps and then mechanically agitated for 10 minutes. Dry hexane (24 ml) was added, followed by agitating for an additional 15 minutes. To this slurry was added 7.00 ml of a toluene solution containing rac-dimethylsilane-bis-($^5$-2-methyl-4-phenylindenyl)zirconium(1,4-diphenyl-1,3-butadene) (0.0917 gm, 120 μmol Zr). The vial was rinsed with 2× 9 ml of hexane which were combined with silica slurry. The slurry was mechanically agitated for 3 hours. The blue silica was isolated on a medium frit, washed 2× with 30 ml of hexanes and the remaining volatiles were then removed under reduced pressure to give a blue solid (Catalyst A).

Catalyst B:

An activator compound di($C_{14-18}$ alkyl)methylammonium 1,3-bis(tris(pentafluorophenyl)alumane)-2-undecylimidazolide ($[(C_{18}H_{37})_2CH_3NH)][((C_6F_5)_3Al)_2C_3H_3N_2C_{11}H_{23}]$) was prepared as described in Activator Preparation Cl at pages 31–32 of WO-01/23442 A1. A transition metal compound rac-[dimethylsilanediyl bis(1-(2-methyl-4-phenyl)indenyl)] zirconium (trans, trans-1,4-diphenyl-1,3-butadiene) was prepared as disclosed in Example 15 of U.S. Pat. No. 5,616,664. Solutions of cocatalyst and transition metal compound were prepared in toluene each at a concentration of 0.005 M. Equi-molar (equi-volume) quantities of these two solutions were combined in a small vial to which 4 mL of toluene was added. The resulting catalyst solution (Catalyst B) was transferred to a catalyst shot tank on the reactor from the glove box via 1/16" (0.16 cm) stainless steel transfer lines using nitrogen pressure. This was followed by a 5 mL toluene wash.

Example 1

Bulk Slurry Polypropylene Polymerization (Runs 1–6)

All liquid reagents were purified by sparging with purified nitrogen followed by passage through columns containing activated alumina (A-2, available from LaRoche Inc.) and Q5 reactant (available from Englehard Chemicals Inc.) at 50 psig using a purified nitrogen pad. All transfers of solvents and solutions described below were accomplished using a gaseous pad of dry, purified nitrogen or argon. The divinylbenzene compound used was purchased from Aldrich as a technical grade 80 weight percent pure divinylbenzene, containing about 2 weight parts of meta-divinylbenzene per weight part of para-divinylbenzene. The remaining 20 percent consisted predominantly of isomers of ethylvinylbenzene. The divinylbenzene was purified by sparging with purified nitrogen and passage through a column of activated alumina. Gaseous feeds to the reactor were purified by passage through columns of A-204 alumina (available from LaRoche Inc.) and Q5 reactant. The aluminas were previously activated by treatment at 375° C. with nitrogen and Q5 reactant was activated by treatment at 200° C. with 5 percent hydrogen in nitrogen.

Batch reactor polymerizations were conducted in a 1.8 L Büchi reactor equipped with a hot oil (Syltherm XLT) heating jacket and a bottom drain valve. Pressures, temperatures and block valves were computer monitored and controlled. Liquid and gaseous reagents were measured with a micromotion flow meter and fed to the reactor. The contents of the reactor were stirred at 800 rpm. Hydrogen, if desired, was added by differential expansion from a 50 ml shot tank initially at 240 psig. The desired amount of divinylbenzene was diluted to a total of 5 mL using toluene, which was transferred to the reactor from the glove box via 1/16 (0.16 cm) stainless steel transfer lines using nitrogen pressure. This was followed by two 5 mL toluene washes. This was followed by addition of 500 g propylene, and the desired amount of ethylene. The initial reactor temperature was maintained at 25° C. The desired amount of catalyst was weighted in the glove box, suspended into 20 mL hexane and transferred from the glove box to the catalyst shot tank using a syringe with a large bore needle. The catalyst tank was then pressurized to 500 psig (3.55 Mpa) using nitrogen. After the contents of the reactor had stabilized at the initial run temperature of 25° C., the catalyst A was injected into the reactor via a dip tube. The temperature was maintained by allowing cold oil (Syltherm XLT) to pass through the reactor jacket. A prepolymerization was allowed to proceed for 10 minutes (runs 1 and 3) or 15 minutes (run 2) followed by heating (for 2 to 3 minutes) the reactor to 70° C. Subsequently the polymerization mixture was left to react the remainder of the run time as indicated in the table. The contents of the reactor were then expelled into a 6 liter nitrogen purged vessel. Volatile materials were removed from the polymers in a vacuum oven that gradually heated the polymer to 140° C. overnight and cooled to at least 50° C. prior to removal from the oven. After completion of the polymerization, the reactor was washed twice with 800 ml of Isopar E™ solvent (purchased form ExxonMobil), first at 70° C. and then at 150° C. before reuse. The polymerization conditions, yields, polymer properties are contained in Tables 1A and 2. The catalyst mass and the catalyst efficiency are expressed based on the total mass of the catalyst composition.

Example 2

Solution Polypropylene Polymerization (Runs 7–9)

Runs 7–8

All reagents and materials used were the same and pretreated as described in Example 1, unless mentioned differently herein. Batch reactor polymerizations were conducted in a 1.8 L Büchi reactor equipped with a hot oil (Syltherm XLT) heating jacket and a bottom drain valve. Pressures, temperatures and block valves were computer monitored and controlled. Liquid and gaseous reagents were measured with a micromotion flow meter and fed to the reactor. The desired amount of divinylbenzene was added to the reactor and diluted to a total of 5 mL using toluene, from the glove box via 1/16 (0.16 cm) stainless steel transfer lines using nitrogen pressure. This was followed by two 5 mL toluene washes. Hydrogen, if desired, was added by differential expansion from a 50 ml shot tank initially at 240 psig. This was followed by 550 g Isopar E™ solvent, 180 g propylene, and the desired amount of ethylene. The contents of the reactor were stirred at 800 rpm. After loading of the reactor, the initial temperature was brought to 70° C. The desired amount of catalyst B was diluted to a total of 5 mL using toluene, and was transferred from the glove box to the catalyst shot tank. The catalyst tank was then pressurized to 500 psig (3.55 Mpa) using nitrogen and the solution catalyst B was injected into the reactor. This was followed by three 5 mL toluene washes. The temperature was maintained by allowing cold oil (Syltherm XLT) to pass through the reactor jacket. Later additions of solution catalyst could be performed in order to force the polymerization to a higher conversion. The polymerization mixture was left to react for the time period as indicated in the table 1B. The contents of the reactor were then expelled into a 6 liter nitrogen purged vessel. The reactor was washed twice with 800 g of Isopar E™ solvent, first at 70° C. and then at 140° C. before reuse. The residual solvent and remaining volatile materials were removed from the polymers in a vacuum oven that gradually heated the polymer to 140° C. overnight and cooled to at least 50° C. prior to removal from the oven. The polymerization conditions, yields, polymer properties are contained in Tables 1B and 2. For solution polymerization the amount of catalyst in μmoles is expressed based on zirconium content, while catalyst efficiency is expressed as a ratio of polymer mass to zirconium mass.

Run 9:

A two-liter Parr reactor was charged with 399 grams of Isopar E solvent and 2 mL of divinyl benzene (scrubbed in the drybox through activated A2 alumina prior to use) followed by a charge of 93 grams of propylene. Hydrogen was added as a molecular weight control agent by differential pressure expansion from a 75 mL addition tank at 275 psig (345 kPa). 5.3 Grams of ethylene was added and the reactor was heated to the desired run temperature of 100° C. The appropriate amount of catalyst [$^3$-(2,6-di(isopropyl)phenyl)((2-methylphenyl)(6-(naphth-2-yl)-2-pyridyl)methyl)amido]dimethyl hafnium (prepared according to the procedures disclosed in WO-02/8628) and cocatalyst di(octadecyl)methylammonium tetrakis(pentafluorophenyl)borate (prepared as disclosed in example 1 of U.S. Pat. No. 6,121,185), as 0.005M and 0.006 M solutions in toluene, respectively, were premixed in a 1 to 1.2 ratio in a glove box. 30 Equivalents of PMAO-IP (300 microliter of 0.15 M in toluene, Akzo-Nobel) relative to catalyst were added to this mixture before being transferred to a catalyst addition tank and injected into the reactor. The polymerization conditions were maintained during the run. The resulting solution was removed from the reactor into a nitrogen purged collection vessel containing 100 ml of isopropyl alcohol and 20 ml of a toluene solution of 6.7 mg hindered phenol antioxidant (Irganox™ 1010 from Ciba Geigy Corporation) and 13.4 mg phosphorus stabilizer (Irgafos 168). Polymers formed are dried in a programmed vacuum oven with a maximum temperature of 140° C. and 20 hours heating. The amount of catalyst in μmoles is expressed based on hafnium content, while catalyst efficiency is expressed as a ratio of polymer mass to hafnium mass.

TABLE 1A

| Ex. 1 Run # | Cat (mg) | DVB (mL) | Ethylene (g) | $H_2$ (psi) | Run Time (min) | Yield (g) | Efficiency (gP/g cat) | MW | MWD | Melting Point (° C.) |
|---|---|---|---|---|---|---|---|---|---|---|
| 1 | 30.5 | 0.5 | 3.6 | 0 | 14 | 81.2 | 2,650 | 354,000 | 2.34 | 146.2 |
| 2 | 15.3 | 1.0 | 3.8 | 0 | 25 | 80.0 | 5,250 | 359,000 | 3.00 | 146.0 |
| 3 | 20.3 | 2.0 | 3.5 | 0 | 40 | 26.9 | 1,350 | 328,000 | 2.27 | 146.0 |
| 4** | 66* | 2.0 | 3.5 | 0 | 70 | 63.4 | 950 | 314,000 | 2.69 | 144.2 |
| 5 | 35.5 | 5.0 | 3.4 | 30 | 40 | 86.9 | 2,450 | 155,000 | 2.4 | 145.4 |
| 6 (comp) | 30.5 | 0 | 3.5 | 0 | 18 | 83.6 | 2,750 | 489,000 | 3.0 | 146.4 |

*34 mg catalyst injected at start of run and 32 mg injected after 35 minutes into run
**Sample dried in vacuum at room temperature

TABLE 1B

| Ex. 2 Run # | Cat (μmol) | DVB (mL) | Ethylene (g) | $H_2$ (Δ psi) | Run Time (min) | Yield (g) | Efficiency (g P/g Zr) | MW | MWD | Melting Point (° C.) |
|---|---|---|---|---|---|---|---|---|---|---|
| 7 | 3.0 | 2 | 3 | 0 | 83 | 64.7 | 236,425 | 225,000 | 2.13 | 134.4 |
| 8‡ | 5.0 | 4 | 6 | 0 | 175 | 117.7 | 258,000 | 148,000 | 3.48 | 127.5 |
| 9 | 1.50 | 2 | 5.3 | 6.4 | 21 | 44.3 | 165,000 | 1,210,000 | 4.5 | 124.3 |

‡A total of 7 shots of solution catalyst added, which total to 5.0 μmoles Zr.

TABLE 2

| Run # | Propylene units (mole %) | DVB units (mole %) | Ethylene units (mole %) | A (×10³) | B (×10³) | D (×10³) | Z (×10³) | BF Value | BTF Value | mm % |
|---|---|---|---|---|---|---|---|---|---|---|
| 1 (Ex. 1) | 99.1 | 0.019 | 0.87 | 78 | 47 | 0.0 | 0 | 0 | 0.60 | 94.8 |
| 3 (Ex. 1) | 98.9 | 0.066 | 1.0 | 824 | 454 | 0.0 | 0 | 0 | 0.55 | 95.3 |
| 4 (Ex. 1) | 98.9 | 0.072 | 1.0 | 295 | 163 | 0.0 | 0 | 0 | 0.55 | 95.1 |
| 7 (Ex. 2) | 97.8 | 0.10 | 2.1 | 0.59 | 0.28 | 0.0 | 0.23 | 0 | 0.48 | 95.8 |
| 8 (Ex. 2) | 95.0 | 0.21 | 4.8 | 1.6 | 1.2 | 0.095 | 0.3 | 0.03 | 0.76 | 93.1 |
| 9 (Ex. 2) | 86.2 | 0.18* | 13.6 | 0.09* | 0.15* | 0.17* | 0.44* | 0.7 | 1.8 | 97.0 |

*The error margins in these NMR values are ± 0.05

The polymer products of the present invention show levels of branching. This is illustrated also in FIGS. 2, 4, and 5 that provide the intrinsic viscosity numbers for the respective polymers throughout their molecular weight spectrum. Greater lowering of the intrinsic viscosity at equivalent polymer molecular weights is evidence of a more highly branched polymer sample and the effect is more pronounced at higher polymer molecular weights. Furthermore, the decrease in intrinsic viscosity is directly related to the amount of DVB incorporated in the polymers. This corresponds to an increased level of branching for the polymers containing a higher level of DVB.

FIG. 3 shows the relationship between tensile stress growth coefficient and time at different strain rates for the polymer according to Ex 1, Run 3. Illustrated here are the dependencies of tensile stress growth coefficient $\eta_E^+$ on time and strain rate, $\dot{\epsilon}$, at 175° C. For comparative purposes the curve of a theoretical linear polymer of propylene of the same molecular weight is presented in the same figure, with the corresponding theoretical result given by the equation in the legend. The polymer according to the present invention exhibits a considerable degree of strain hardening, indicated by $\eta_E^+>3|\eta^*|$, observed for t>1 sec at all strain rates.

The current polymers have a very high degree of isotacticity of around 95% mm and thus provide highly isotactic polypropylenes with improved processability, thereby maintaining good heat resistance and good physical properties.

What is claimed is:

1. A polymer comprising units (1) derived from an aipha-olefin having at least 3 carbon atoms (1'), units (2) derived from divinylbenzene or $C_{1-10}$ hydrocarbyl substituted derivatives thereof (2'), and units (3) derived from ethylene (3'), the polymer comprising at least 75 mole % of units (1), from 0.01 to 5 mole % of units (2), and up to 20 mole % of units (3), the polymer having a branching factor BF≦0.75, factor BF representing the ratio D/(A+B) wherein D, A, and B are integrated signal values determined by quantitative carbon-13 NMR spectroscopy of the polymer wherein A represents the integrated value of the signals in the range of 145.0 to 142.5 ppm, B represents the integrated value of the signals in the range of 142.5 to 139.0 ppm, and D represents the integrated value of the signals in the range of 115.0 to 112.5 ppm.

2. A polymer according to claim 1 wherein the BF factor has a value in the range 0≦BF 0.50.

3. A polymer according to claim 1 having a branching type factor BTF≧0.01, the factor BTF representing the ratio (B/A) wherein A and B are integrated signal values determined by quantitative carbon-13 NMR spectroscopy of the polymer wherein A represents the integrated value of the signals in the range of 145.0 to 142.5 ppm and B represents the integrated value of the signals in the range of 142.5 to 139.0 ppm.

4. A polymer according to claim 3 wherein BTF has a value in the range 0.01≦BTE≦50.

5. A polymer according to claim 1 wherein units (1) are derived from propylene or from propylene and one or more alpha-olefins having from 4 to 20 carbon atoms (1').

6. A polymer according to claim 1 wherein units (2) are derived from p-divinylbenzene, m-divinylbenzene, or o-divinylbenzene, or a mixture of two or more of these (2').

7. A polymer according to claim 1 comprising at least 85 mole % of units (1), from 0.02 to 4 mole % of units (2), and 0.05 to 10 mole % of units (3) derived from ethylene.

8. A polymer comprising units (1) derived from propylene or propylene with one or more alpha-olefins having from 4 to 20 carbon atoms (1'), units (2) derived from p-divinylbenzene, m-divinylbenzene, or o-divinylbenzene, or a mixture of two or more of these (2'), and units (3) derived from ethylene (3'), the polymer comprising at least 85 mole % of units (1), from 0.02 to 4 mole % of units (2), and from 0.05 to 10 mole % of units (3), the polymer having a branching factor in the range of 0≦BF≦0.50, and a branching type factor in the range of 0.01≦BTF≦50; wherein said BF representing the ratio D/(A+B) wherein D, A, and B are integrated signal values determined by quantitative carbon-13 NMR spectroscopy of the polymer wherein A represents the integrated value of the signals in the range of 145.0 to 142.5 ppm, B represents the integrated value of the signals in the range of 142.5 to 139.0 ppm, and D represents the integrated value of the signals in the range of 115.0 to 112.5 ppm, and said BTF representing the ratio (B/A) wherein A and B are integrated signal values determined by quantitative carbon-13 NMR spectroscopy of the polymer wherein A represents the integrated value of the signals in the range of 145.0 to 142.5 ppm and B represents the integrated value of the signals in the range of 142.5 to 139.0 ppm.

9. A process for preparing a polymer comprising units (1) derived from an alpha-olefin having at least 3 carbon atoms (1'), units (2) derived from divinylbenzene or $C_{1-10}$ hydrocarbyl substituted derivatives thereof (2'), and units (3) derived from ethylene (3'), by contacting the aipha-olefin (1'), the divinylbenzene or $C_{1-10}$ hydrocarbyl substituted derivatives thereof (2'), and ethylene (3') in the presence of a polymerization catalyst under polymerization conditions wherein the mole ratio of aipha-olefin (1') to divinylbenzene or $C_{1-10}$ hydrocarbyl substituted derivatives thereof (2') is at least 10:1, the mole ratio of divinylbenzene or $C_{1-10}$ hydrocarbyl substituted derivatives thereof (2') to ethylene (3') is in the range of from 1:0.1 to 1:2000, and the mole ratio of alpha-olefin (1') to ethylene (3') is at least 4:1; wherein said polymer having a branching factor BF≦0.75, factor BF representing the ratio D/(A+B) wherein D, A, and B are integrated signal values determined by quantitative carbon-13 NMR spectroscopy of the polymer wherein A represents the integrated value of the signals in the range of 145.0 to 142.5 ppm, B represents the integrated value of the signals in the range of 142.5 to 139.0 ppm, and D represents the integrated value of the signals in the range of 115.0 to 112.5 ppm.

10. A process according to claim 9 wherein alpha-olefin (1') comprising propylene or propylene with one or more alpha-olefins having from 4 to 20 carbon atoms, divinylbenzene compound (2') comprising p-divinylbenzene, m-divinylbenzene, or o-divinylbenzene, or a mixture of two or more of these, and ethylene (3') are contacted.

11. A process according to claim 10 wherein the mole ratio of aipha-olefin (1') to divinylbenzene compound (2') is at least 20:1 and the mole ratio of divinylbenzene compound (2') to ethylene (3') is in the range of from 1:0.5 to 1:1000.

12. A process according to claim 9 wherein the polymer is prepared in the form of particles or dissolved in a polymerization diluent.

13. A process according to claim 12 wherein the polymer is prepared in the form of a slurry of particles in a polymerization diluent.

14. A process according to claim 13 wherein the polymerization diluent is alpha-olefin (1') in liquid form.

15. A process according to claim 9 wherein the polymerization catalyst comprises a transition metal complex corresponding to:

the formula: $Lp_lMX_mX'_nX''_p$, or a dimer thereof wherein:

Lp is an anionic, delocalized, π-bonded group that is bound to M, containing up to 50 non-hydrogen atoms, optionally two Lp groups may be joined together forming a bridged structure, and further optionally one Lp may be bound to X;

M is a metal of Group 4 of the Periodic Table of the Elements in the +2, 3 or +4 formal oxidation state;

X is an optional, divalent group of up to 50 non-hydrogen atoms that together with Lp forms a metallocycle with M;

X' is an optional neutral ligand having up to 20 non-hydrogen atoms;

X" each occurrence is a monovalent, anionic moiety having up to 40 nonhydrogen atoms, optionally, two X" groups may be covalently bound together forming, a divalent dianionic moiety having both valences bound to M, or, optionally 2 X" groups may be covalently bound together to form a neutral, conjugated or non-conjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M; or a metalligand complexes of general formula:

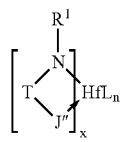

wherein $R^1$ is selected from the group consisting of alkyl, substituted alkyl, cycloalkyl, substituted cycloalkyl, heteroalkyl, substituted heteroalkyl, heterocycloalkyl, substituted hetercycloalkyl, aryl, substituted aryl, heteroaryl, substituted heteroaryl and combinations thereof, T is a bridging group selected from the group consisting of —$CR^2R^3$— and —$SiR^2R^3$— with $R^2$ and $R^3$ being independently selected from the group consisting of hydrogen, alkyl, substituted alkyl, cycloalkyl, substituted cycloalkyl, heteroalkyl, substituted heteroalkyl, heterocycloalkyl, substituted hetercycloalkyl, aryl, substituted aryl, heteroaryl, substituted heteroaryl, alkoxyl, aryloxyl, silyl, boryl, phosphino, amino, thio, seleno, halide, nitro, and combinations thereof, J" is selected from the group consisting of heteroaryl and substituted heteroaryl, x is 1 or 2, each L is independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3dionates, oxalates, carbonates, nitrates, sulphates, and combinations thereof, and n is 3 (when x is 1) or and n is 1 or 2 (when x is 2), wherein J" may or may not datively bond; or a metalligand complexes of general formula:

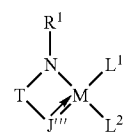

where M is zirconium or hafnium;

$R^1$ and T are defined above;

J'" being selected from the group of substituted heteroaryls with 2 atoms bonded to the metal M, at least one of those 2 atoms being a heteroatom, and with one atom of J'" is bonded to M via a dative bond, the other through a covalent bond; and $L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3dionates, oxalates, carbonates, nitrates, sulphates, and combinations thereof.

16. A process according to claim 15 wherein the transition metal complex being rendered catalytically active by combination with an activating cocatalyst or by an activating technique.

17. A blend of the polymer of claim 1 with at least one other polymer.

18. An article prepared from or containing the polymer of claim 1.

* * * * *